(12) United States Patent
Chen et al.

(10) Patent No.: US 10,569,950 B2
(45) Date of Patent: Feb. 25, 2020

(54) SELF-VENTING BAG-IN-BOX PACKAGE

(71) Applicant: Bemis Company, Inc., Neenah, WI (US)

(72) Inventors: Peter M. Chen, Appleton, WI (US); Jay D. Hodson, Hortonville, WI (US); Jordan R. Tracy, Appleton, WI (US); Otacilio T. Berbert, Oshkosh, WI (US); Donald C. Schnabel, Oshkosh, WI (US)

(73) Assignee: Bemis Company, Inc., Neenah, WI (US)

( * ) Notice: Subject to any disclaimer, the term of this patent is extended or adjusted under 35 U.S.C. 154(b) by 0 days.

(21) Appl. No.: 16/066,601

(22) PCT Filed: Dec. 31, 2015

(86) PCT No.: PCT/US2015/068317
§ 371 (c)(1),
(2) Date: Jun. 27, 2018

(87) PCT Pub. No.: WO2017/116473
PCT Pub. Date: Jul. 6, 2017

(65) Prior Publication Data
US 2019/0002182 A1 Jan. 3, 2019

(51) Int. Cl.
*B65D 77/06* (2006.01)
*B65D 81/34* (2006.01)
(Continued)

(52) U.S. Cl.
CPC .......... *B65D 81/3453* (2013.01); *B32B 11/08* (2013.01); *B65D 77/064* (2013.01);
(Continued)

(58) Field of Classification Search
CPC .............. B65D 81/3453; B65D 77/064; B65D 2581/3428; B32B 7/12; B32B 11/08;
(Continued)

(56) References Cited

U.S. PATENT DOCUMENTS 3,184,117 A 5/1965 Sanderson et al.
3,655,503 A 4/1972 Stanley et al.
(Continued)

FOREIGN PATENT DOCUMENTS

EP 1783061 A1 5/2007
EP 1870350 B1 4/2013
(Continued)

*Primary Examiner* — Frederick C Nicolas
(74) *Attorney, Agent, or Firm* — Lynn M. Nett

(57) ABSTRACT

A package for storing or preparing food or other products includes a flexible pouch within which the product can be sealed, and a box' or other container sized to hold the pouch. To seal the product in the pouch, the pouch includes a peelable seal that seals a portion of a first thermoplastic film to a portion of a second thermoplastic film, such films optionally forming walls of the pouch. The package, including the container and the pouch, is configured for beating the sealed product m " a microwave oven, in a heated state, pressure inside the pouch increases to expand the pouch, and the container constrains or limits expansion of the pouch in some places but not at an expansion region of the container. A portion of the peelable seal is proximate such region, producing a separation in such peelable sea! portion such that the pouch self-vents through the separation.

19 Claims, 8 Drawing Sheets

(51) Int. Cl.
*B32B 11/08* (2006.01)
*B32B 27/08* (2006.01)
*B32B 27/36* (2006.01)
*B32B 27/32* (2006.01)
*B32B 7/12* (2006.01)
*B32B 27/30* (2006.01)
*B32B 27/16* (2006.01)
*B32B 27/18* (2006.01)

(52) U.S. Cl.
CPC ............. *B32B 7/12* (2013.01); *B32B 27/08* (2013.01); *B32B 27/16* (2013.01); *B32B 27/18* (2013.01); *B32B 27/306* (2013.01); *B32B 27/32* (2013.01); *B32B 27/36* (2013.01); *B32B 2250/03* (2013.01); *B32B 2250/04* (2013.01); *B32B 2250/05* (2013.01); *B32B 2250/24* (2013.01); *B32B 2255/10* (2013.01); *B32B 2255/20* (2013.01); *B32B 2307/306* (2013.01); *B32B 2307/31* (2013.01); *B32B 2307/41* (2013.01); *B32B 2307/412* (2013.01); *B32B 2307/414* (2013.01); *B32B 2307/546* (2013.01); *B32B 2307/7242* (2013.01); *B32B 2307/7244* (2013.01); *B32B 2307/7246* (2013.01); *B32B 2307/7265* (2013.01); *B32B 2307/732* (2013.01); *B32B 2307/748* (2013.01); *B32B 2307/75* (2013.01); *B32B 2439/40* (2013.01); *B32B 2439/70* (2013.01); *B32B 2553/00* (2013.01); *B65D 2581/3428* (2013.01)

(58) Field of Classification Search
CPC ......... B32B 27/08; B32B 27/16; B32B 27/18; B32B 27/306; B32B 27/32; B32B 27/36; B32B 2250/03; B32B 2250/04; B32B 2250/05; B32B 2250/24; B32B 2255/10; B32B 2255/20; B32B 2307/306; B32B 2307/31; B32B 2307/41; B32B 2307/412; B32B 2307/414; B32B 2307/546; B32B 2307/7242; B32B 2307/7244; B32B 2307/7246; B32B 2307/7265; B32B 2307/732; B32B 2307/748; B32B 2307/75; B32B 2439/40; B32B 2439/70; B32B 2553/00

See application file for complete search history.

(56) References Cited

U.S. PATENT DOCUMENTS

| | | | |
|---|---|---|---|
| 4,058,632 | A | 11/1977 | Evans et al. |
| 4,189,519 | A | 2/1980 | Ticknor |
| 4,252,846 | A | 2/1981 | Romesberg et al. |
| 4,448,309 | A | 5/1984 | Roccaforte et al. |
| 4,550,141 | A | 10/1985 | Hoh |
| 4,615,926 | A | 10/1986 | Hsu et al. |
| 4,666,778 | A | 5/1987 | Hwo |
| 4,784,885 | A | 11/1988 | Carespodi |
| 4,875,587 | A | 10/1989 | Lulham et al. |
| 4,882,229 | A | 11/1989 | Hwo |
| 4,916,190 | A | 4/1990 | Hwo |
| 4,937,139 | A | 6/1990 | Genske et al. |
| 4,944,409 | A | 7/1990 | Busche et al. |
| 5,023,121 | A | 6/1991 | Pockat et al. |
| 5,128,414 | A | 7/1992 | Hwo |
| 5,178,294 | A | 1/1993 | Hill et al. |
| 5,189,272 | A | 2/1993 | McDonald et al. |
| 5,547,752 | A | 8/1996 | Yanidis |
| 5,863,578 | A | 1/1999 | Guarino |
| 5,997,968 | A | 12/1999 | Dries et al. |
| 6,105,821 | A * | 8/2000 | Christine ............ B65D 77/065 222/105 |
| 6,476,137 | B1 | 11/2002 | Longo |
| 6,596,355 | B1 | 7/2003 | Mita et al. |
| 6,848,596 | B2 * | 2/2005 | Balz .................... B65D 75/008 222/1 |
| 7,034,268 | B2 | 4/2006 | Hopkins, Sr. |
| 7,198,179 | B2 * | 4/2007 | Gilkerson ............ A61K 8/046 222/105 |
| 8,434,637 | B2 | 5/2013 | Mita et al. |
| 8,734,015 | B2 | 5/2014 | Futase |
| 8,939,351 | B2 | 1/2015 | Goudreau et al. |
| 9,850,046 | B2 * | 12/2017 | Stanley ............... B65D 75/008 |
| 2005/0079252 | A1 | 4/2005 | Kendig et al. |
| 2005/0173425 | A1 | 8/2005 | Wnek et al. |
| 2005/0276885 | A1 | 12/2005 | Bennett |
| 2012/0114269 | A1 | 5/2012 | Futase et al. |
| 2013/0048636 | A1 | 2/2013 | Mack |
| 2015/0291342 | A1 | 10/2015 | Mack |

FOREIGN PATENT DOCUMENTS

| | | |
|---|---|---|
| WO | WO0179072 A1 | 10/2001 |
| WO | WO2014133573 A1 | 9/2014 |
| WO | WO2015179651 A2 | 11/2015 |
| WO | WO2016022148 A1 | 2/2016 |

* cited by examiner

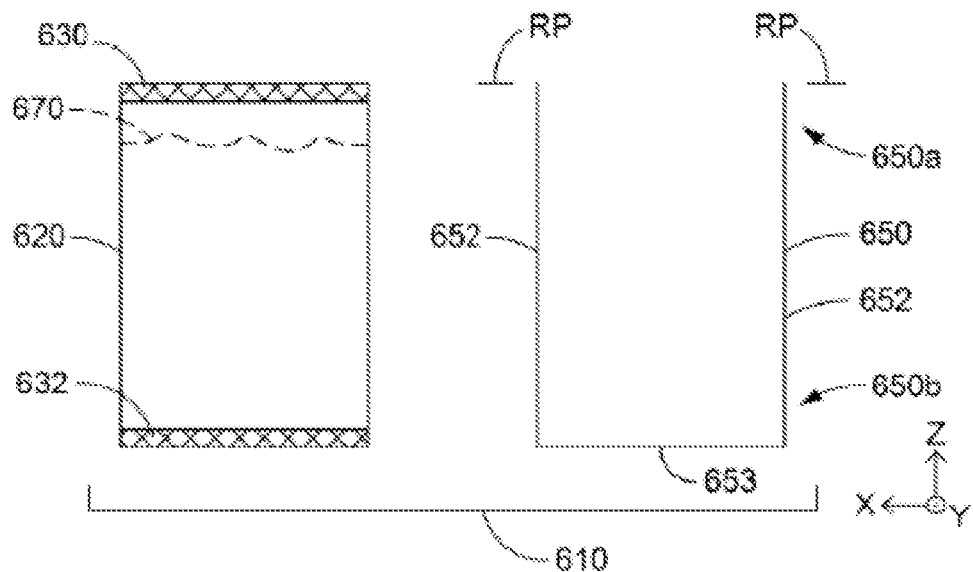
FIG. 6A
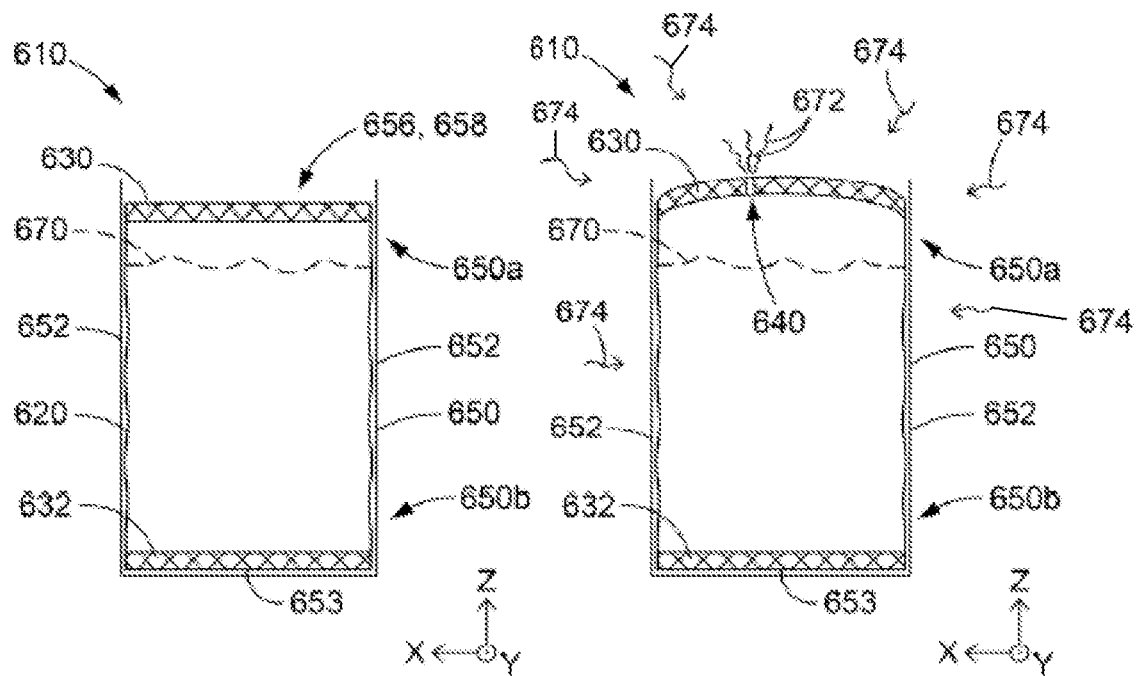
FIG. 6B
FIG. 6C

SELF-VENTING BAG-IN-BOX PACKAGE

FIELD OF THE INVENTION

The invention relates generally to packaging for products, such as food packaging or the packaging or storage of other suitable food or non-food products. The invention is particularly applicable to such packages that are commonly referred to as bag-in-box packages and retort pouches.

BACKGROUND

Many different types of packaging products are known. In the case of packaging products for foods, some of the know types include metal cans e.g. for soups, bags e.g. for potato chips or other snacks, stand up pouches (SUPs) e.g. for frozen vegetables, rigid polypropylene Containers e.g. for sour cream or margarine tubs, bag-in-box packages e.g. for wine or other beverages, and retort packaging e.g. for military meals ready-to-eat (MREs).

SUMMARY

We have developed a new family of packages that can be used to store, heat, and in some cases serve or dispense various food and non-food products. Many of these packages fall within the category known as bag-in-box packages, because they include a bag or pouch that is designed to encapsulate the product, and a box or other container within which the pouch can be placed. Unlike most existing bag-in-box packages, the disclosed packages and their contents can be heated by exposing the package to microwave radiation in a microwave oven. The pouch, which may be configured as a retort pouch, includes a peelable seal that is designed to self-vent in response to increased pressure within the pouch during heating. The location of self-venting can be controlled by positioning the pouch within the container such that at least a portion of the peelable seal is unconstrained b the container, for example by locating the peelable seal portion near a pressure relief opening of the container, or near a frangible container portion that can provide such a pressure relief opening, or by simply locating the peelable seal portion at a place within the container where the pouch has room to expand rather than being constrained by a wall of the container.

A given package may include a flexible pouch within which a microwave-heatable product can be sealed, and a container sized to hold the pouch. To seal the product in the pouch, the pouch may include a peelable seal that seals a portion of a first thermoplastic film to a portion of a second thermoplastic film, such turns optionally forming walls of the pouch. The package, including the container and the pouch, may be configured for heating the sealed product in a microwave oven. In a heated state, the pouch may develop an increased pressure which expands the pouch, and the container may constrain or limit expansion of the pouch in some places but not in an expansion region. The expansion region may be or comprise a pressure relief opening, a frangible container portion, or a headspace or other gap between the pouch and a wall of the container. Reduced constraint in the expansion region promotes the formation of a separation in the peelable seal portion in the expansion region, the separation allowing for venting of hot gasses that would otherwise be trapped within the heated pouch.

We also describe herein, among other things, packages that include a flexible pouch within which a product is sealed, and a container sized to hold the pouch. The pouch includes a first thermoplastic film, a second thermoplastic film, and a peelable seal that seals a portion of the first thermoplastic film to a portion of the second thermoplastic film. The package is configured for heating the sealed product in a microwave oven. The first and second thermoplastic films may in some cases form walls on opposite sides of the pouch. The first and second thermoplastic films may in some cases be substantially the same, for example, they may be different portions of a single piece of single layer or multilayered thermoplastic film.

Related articles, systems, and methods can also be found in the appended claims and/or in the detailed description that follows.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification reference is made to the appended drawings, where like reference numerals designate like elements, and where:

FIG. 6A is a schematic side or sectional view of a combination pouch/container for use as a package, and FIGS. 6B and 6C show the same combination but where the pouch is placed inside the container, the package being in an unheated state in FIG. 6B and being in a heated state (and self-venting through a separation in a peelable seal) in FIG. 6C;

DETAILED DESCRIPTION

As mentioned above, we have developed a new family of packages in which a food or other item can be sealed in a pouch, and the pouch placed in a container to provide a bag-in-box-type product, the product optionally being suitable for retail sale to consumers. The package is adapted for heating in a microwave oven. The pouch self-vents the formation of a separation in a peelable seal at an elevated pouch pressure during heating. The pouch may be suitable for hot fill, retort, or other sterilization processes.

In the discussion that follows, the packages will be described primarily in the context of food packaging, such as for soups, sauces, pastes, vegetables, or other suitable food items, any of which may be shelf-stable, refrigerated, or frozen. Nevertheless, the reader will understand that the packages are not limited to food applications, but can be used with other materials or items, particularly materials and items that are capable of being heated by microwave radiation, such as in a microwave oven. The packages are optionally compatible with Several consumer trends and preferences, such as convenience of use, recyclability, and the ability to see the product, as discussed further below.

Figure 1:
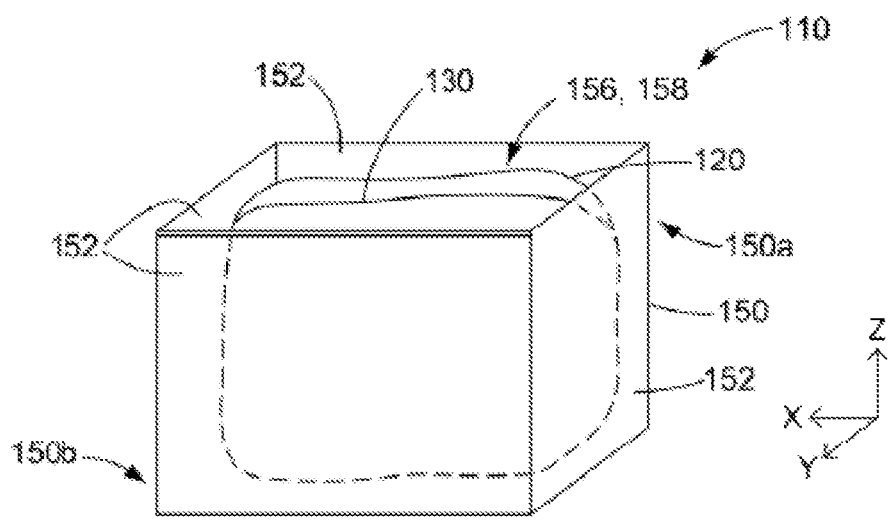
FIG. 1 is a schematic perspective view of a package that includes a bag or pouch disposed inside a container, the pouch having a peelable seal.

In FIG. 1, we see a simple example of such a package. The package 110 includes, or may consist essentially of, a flexible pouch 120 disposed inside a container 150. The components and contents of the package 110 are preferably compatible with heating in a microwave oven. The package 110 is shown in the context of a Cartesian x-y-z coordinate system for reference purposes.

The pouch 120 is sealed to isolate a food item inside the pouch. At least part of the sealing mechanism of the pouch is a peelable seal 130, the peelability allowing access to the food item as well as allowing for a self-venting feature as described further below. The peelable seal 130 is typically formed between portions of a first and second thermoplastic film (not labeled in FIG. 1). The first and second thermoplastic films may form walls or panels of the pouch 120 on opposite sides of the sealed food item, and on opposite sides of the pouch. In general, the first and second thermoplastic films may be films of different composition construction, or thickness, but in simple embodiments they may be different portions of a single piece of thermoplastic film, and thus may be substantially identical to each other. The thermoplastic film(s) may be of single layer construction, or they may have a multilayered construction. The thermoplastic film(s) may also have high barrier properties for water, vapor, oxygen, or other designated gasses or liquids. Furthermore, the thermoplastic film(s) may be light-transmissive, e.g. transparent or at least translucent, such that the food product can be seen through the film. In other cases, the thermoplastic film(s) may be substantially opaque. Printing and graphics can also be applied to the thermoplastic film(s) and thus to the pouch 120.

The pouch 120 may be a high barrier, foil-less, two-side sealable pouch that is able to survive the remit process. "Retort" in this regard refers to a sterilization process in which a food item packaged in a flexible package is heated to about 220-250 degrees F. (about 104-121 degrees C.) or higher for several minutes under high pressure. One multilayer thermoplastic film that is suitable for use in some retort applications is a laminate of polypropylene/adhesive/AlOx OPET/adhesive/polypropylene, where AlOx OPET refers to a clear polyethylene terephthalate (PET) film with an aluminum oxide vapor deposition and having high level barrier properties. The retort process may be carried out such that, after sealing the kid item inside the pouch, there is no or substantially no air headspace within the pouch, but in other cases a finite (nonzero) headspace may be formed in the sealed pouch.

Upon exposure to microwave radiation or another source of energy or heat, the food or other product sealed in the pouch 120 heats up to a point where steam or other hot vapors are produced inside the pouch. While the pouch remains sealed, such steam or vapors increase a pressure inside the pouch, causing the pouch to expand, and putting stress on the thermoplastic film(s) and seals of the pouch, including the peelable seal 130. To avoid uncontrolled bursting of the pouch with accompanying spilling or spattering of its hot contents, the peelable seal 130 is designed such that the peel force needed to break or separate the seal is (a) less than the burst strength, of the thermoplastic film(s) that thin the walls of the pouch, and (b) no greater than the peel force (or burst strength in the case of non-peelable or fusion seals) of other seals that may be present in the pouch 120. In some embodiments, the peel strength of the peelable seal 130 (measured at ambient room temperature e.g. in accordance with ASTM test method F88) is less than 7.000 g/in, or less than 6,750 g/in, or in a range from 400 to 6,300 g/in, or in a range from 400 to 2,500 g/in.

"Peelable seal" and like terminology is used in this application to refer to a seal, such as a heat seal, which is engineered to be readily peelable without uncontrolled or random tearing or rupturing the packaging materials which may result in premature destruction of the package and/or inadvertent contamination or spillage of the contents of the package. A peelable seal is one that is peeled apart (e.g., by steam/vapors and pressure) to open the package at the seal without resort to a knife or other implement to tear or rupture the package. Preferably seal parameters such as choice of materials and sealing conditions will be used to adjust the seal strength to the desired level for the particular package and application.

Many varieties of peelable seals are known in the art and are suitable for use. Peelable seals may be made from thermoplastic films having a peelable system designed in such films. Suitable peelable films and/or peelable systems are disclosed in U.S. Pat. No. 4,944,409 (Busche et al.); U.S. Pat. No. 4,875,587 (Lulham et al.); U.S. Pat. No. 3,655,503 (Stanley et al.); U.S. Pat. No. 4,058,632 (Evans et al.); U.S. Pat. No. 4,252,846 (Romesberg et al.); U.S. Pat. No. 4,615,926 (Hsu et al.); U.S. Pat. No. 4,666,778 (Hwo); U.S. Pat.

No. 4,784,885 (Carespodi); U.S. Pat. No. 4,882,229 (Hwo); U.S. Pat. No. 6,476,137 (Longo); U.S. Pat. No. 5,997,968 (Dries, et al.); U.S. Pat. No. 4,189,519 (Ticknor); U.S. Pat. No. 5,547,752 (Yanidis); U.S. Pat. No. 5,128,414 (Hwo); U.S. Pat. No. 5,023,121 (Pockat, et al.); U.S. Pat. No. 4,937,139 (Genske, et al.); U.S. Pat. No. 4,916,190 (Hwo); and U.S. Pat. No. 4,550,141 (Hoh). Films for use in fabricating pouches described in the present application may be selected from multilayer films capable of forming a peelable seal.

A variety of peelable films and peelable sealing systems may be employed. In one embodiment, a film comprising a coextrusion of at least three layers (referred to as three layer peelable system to distinguish it from systems using one or more contaminated seal layers described below) having an outer layer, an inner heat seal layer, and a tie layer disposed between the outer layer and the inner heat seal layer may be used. In this three-layer system embodiment, the film layers are selected such that peeling occurs by breaking apart the tie layer and/or a bond between the tie layer and at least one of the outer and inner layers. Permanent, peelable, and fracturable bonds may be engineered into the coextrusion process, e.g., by providing two adjacent first and second layers having materials with a greater affinity for each other compared to the second layer, and an adjacent third layer where this establishes a relatively permanent bond between the layers, when two materials have a lesser affinity for each other. This three layer structure establishes a relatively permanent bond between the first and second layer which have a greater affinity for one another than the second or third layers which have a lesser affinity where the second layer is common to both the first and third layers as a tie layer or connecting layer. Thus, the lesser affinity between the second and third layers relative to the first and second layers produces a relatively peelable bond between the second and third layers. Selection of the various materials determines the nature of the bond, i.e., whether it is permanent, peelable, fracturable, or a combination of such.

The three-layer coextruded peeling structure described above contemplates optional additional layers to produce a film of 4, 5, 6, 7, 8, 9, 10 or more layers. It is further contemplated that one or more additional layers may be coextruded with the described three layers or separately and that the multilayer film structure may be formed not only by coextrusion, but also by other methods well known in the art such as coating lamination, adhesive lamination, or combinations of such.

It is also contemplated that a peelable seal using one, or more so-called "contaminated" surface layers may be utilized, where peeling occurs at a seal layer interface rather than at an interior layer of film. This type of peeling system may have disadvantages associated with, e.g., controlling the diverging properties of providing high seal strength with desirable low forms for peelings, as well as problems of sealing under conditions which may adversely affect seal integrity, e.g., where an article being packaged deposits particulates, starch, fat, grease or other components which may lessen seal strength or hamper the ability to provide a seal of desired strength such as a strong hermetic fusion bond, e.g., by heat sealing. Such sealing systems are often referred to as two-layer peeling systems, but may include 3, 4, 5, 6, 7, 8, 9, 10 or more layers in the film structure.

Returning to FIG. 1 the container 150 has side walls 152 and a bottom wall (i.e. floor or base, not visible in FIG. 1), and is sized to hold the pouch 120. Preferably, the container size is such that the pouch is held with a small amount or tolerance but not an excessive gap or space between the side walls 152 of the container 150 and the sides of the pouch. The gap or space (if any) may be large enough to allow the pouch to be easily placed in the container, but small enough so that when the pouch expands during, heating, the sides or panels of the pouch press against the walls 152 of the container, such that the walls of the container 150 constrain or prevent any further movement of the pouch beyond the boundaries or the walls, so as to force the pouch to expand in other directions or regions that are less constrained. In that regard, the pouch fits within the container in such a way that the container defines an expansion region 156 where the pouch is unconstrained for at least less constrained than at the side walls 152) with regard to movement due to expansion of the pouch during heating. In the illustrated embodiment, the expansion region 156 corresponds to a pressure relief opening 158 in the container 150, the pressure relief opening 158 owing its existence to the absence of a top wall (i.e. cover) in the container 150. In alternative embodiments, the container may include a complete or partial cover, as well as one or more frangible portions. The expansion region 156 and pressure relief opening 158 are located at a top portion 150a of the container, rather than at a bottom portion 150b thereof. Reasons for this are discussed below.

The container 150, or some or all of its constituent walls, may be relatively stiff and rigid, at least in comparison to walls of the flexible pouch 120. Such stiffness can allow for stacking of multiple packages 110, e.g. on a grocery shelf or on a pallet. However, in alternative embodiments, the container 150, or some or all of its constituent walls, may not be still or rigid, and may even in some cases be as flexible as walls of the pouch 120. More typically, the container 150 may be made of one or more of paperboard (including materials commonly referred to as cardboard), corrugated material, thermoplastic material, and thermoset material. The use of paperboard or cardboard (such as 16 point solid unbleached substrate (SUS) board) for the container 150 provides a paper-like exterior to the consumer, which can be desirable for handling and aesthetics, and to denote a natural, healthy, organic product. Paperboard and some of the other listed materials can also provide the container 150 with heat insulation or resistance, insofar as the outside of the container is much cooler to the touch than the heated pouch when a user is in the process of removing the heated package from a microwave oven.

The container 150 can have any of a variety of shapes, and need not be limited to rectangular parallelpiped (box-like) shapes such as that of FIG. 1. One or more of the container walls may for example be curved, as shown below in FIGS. 15 and 16. The container may also have fewer than four side walls (for example, only three side walls to provide a triangular shape in horizontal cross-section) or more than four side walls, for example, five or six or more. A greater number of side walls can provide a polygonal cross-sectional shape for a container that more closely approximates a standard bowl, or the container may in fact have the shape of a bowl, with a side wall that is curved in the horizontal plane to provide a circular shape in horizontal cross section.

The container 150 may also have other features. In some embodiments, the container may include a frangible portion that can be completely or partially, removed from the remainder of the container to provide a pressure relief opening, some embodiments of which are discussed further below. Labeling or other graphics can be printed on or otherwise applied to one or more outer surfaces of the container. One or more of the side walls may include one or more viewing holes to allow the food item (e.g., soup) to be viewed, provided the pouch is wholly or partially light transmissive. Alternatively, portions of the side walls, or some or all of the walls of the container, may themselves be transparent or otherwise light transmissive to permit such viewing. In the case of viewing holes provided in the side wall(s), such viewing holes are distinguished from a pressure relief opening by being typically smaller than such an opening, and by not being located next to a peelable seal of the pouch 120. Some viewing hole examples are shown below in FIGS. 14-16. In cases where the container is constructed from paperboard, cardboard, or other foldable materials, the container may include one or more flaps or tabs that are glued to a container wall for structural integrity. The glue used for that purpose may be or include a high temperature resistant adhesive so the glue seam remains strong and intact when the package is heated in a microwave oven. The container may be designed to be collapsible. We have found that scoring the bottom wall (base) and side walls or panels of the container can allow a user to collapse the container without compromising the structural integrity of the container for other purposes. Collapsing the container may help the user to extract more of the food contents from the pouch (e.g. where the food is or comprises a viscous fluid, as with some soups) after the pouch has been heated and opened, by allowing the container and the opened pouch to be flattened. The collapsible feature may also be useful for end-of-life recycling purposes.

With regard to considerations involving the relationship or interactions between the pouch 120 and the container 150, as discussed above, the pouch preferably fits within the container such that the container defines an expansion region 156 into which the pouch can expand during heating, and the container holds the pouch such that at least a first portion of the peelable seal 130 is disposed proximate the expansion region 156. During heating, steam or other hot vapors cause the pouch to expand. The pouch can expand only a limited amount in regions where the walls of the container constrain or limit such expansion. Actual expansion of the pouch is therefore concentrated in and near the expansion region 156. The expanding pouch thus expands toward or into the expansion region 156. This concentrated expansion places sufficient stress on the portion of the peelable seal 130 proximate the expansion region 156 to produce a controlled failure or separation of the peelable seal 130 in that region when the pressure inside the pouch reaches a designed threshold. Upon the formation of the separation, steam or other hot vapors begin to escape the pouch or vent through the separation, and pressure that had been building up inside the pouch can begin to level off or decrease. By placing the expansion region 156 at a top portion 150a rather than a bottom portion 150b of the container 150, we ensure the separation occurs at a corresponding top portion of the pouch 120. Water, broth, or other hot liquids that may be part of the food item within the pouch will therefore be much less likely to leak out of the pouch through the separation than if the separation were located at the bottom or middle section of the pouch 120. When the food item is fully cooked or heated, a user may remove the package 110 from the microwave oven, and may then more fully open or separate the peelable seal 130 in the vicinity of the initial separation so as to dispense or access the heated contents of the pouch 120. In some cases, the pouch may include a tear notch to facilitate opening of the pouch 120.

In the embodiment of FIG. 1 the expansion region 156 is a pressure relief opening 158; in other embodiments the expansion region may be a headspace between the pouch and a top wall of the container, or a removable container portion that, when removed from the container, provides a pressure relief opening. The removable container portion, discussed further below, may be a frangible portion of the container. The removable container portion may be removed by the user before heating, or the package may be designed such that expansion of the pouch during heating causes a portion of the pouch (which includes the portion of the peelable seal proximate the expansion region) to press against the removable container portion, and the force from the expanded pouch is sufficient to open the removable container portion. The pouch portion may then protrude from the pressure relief opening, and may form a spout-like structure that cart be used to dispense the heated food item. This is one example of a package 110 in which expansion of the pouch during heating causes a change in the configuration (e.g. the shape) of the container, the changed configuration being easily observed by the user. The heat-induced change in configuration of the container can thus be used as a doneness indicator by the user.

Some of the principles of operation and features discussed above, as well as additional principles and features, will now be illustrated or discussed further in connection with the remaining figures. Cartesian x-y-z coordinate systems similar to that of FIG. 1 are included in many of the figures for reference purposes, but should not be construed in an unduly limiting way.

Figure 2A:
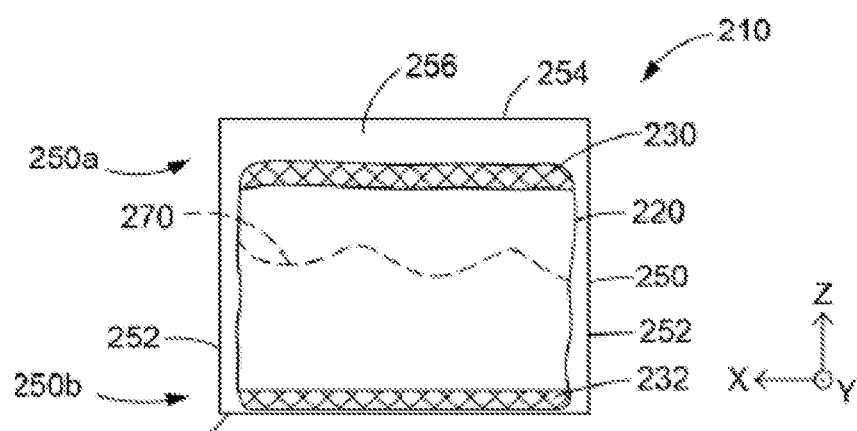
FIG. 2A is a schematic side or sectional view of a package includes a pouch disposed inside a container, the pouch having a peelable seal and holding a food or non-food product.

In FIG. 2A, a package 210 is shown that includes a pouch 220 disposed inside a container 250. The package 219, pouch 220, and container 250, and their respective components, features, and relationships, may be the same as or similar to the packages, pouches, and containers discussed above in connection with FIG. 1.

The container 250 has a top portion 250a and a bottom portion 250b, side walls 252, a bottom all 253 (i.e. floor or base), and an optional top wall 253 (i.e. cover). The pouch 210 has a peelable seal 230 along a top of the pouch, and another seal 232 along a bottom of the pouch. To reduce cost and simplify manufacture, the seal 232 may be substantially the same as the peelable seal 230, e.g. the seal 232 may the same type of peelable seal as the peelable seal 230. Alternatively, the seal 232 may be a different type of seal than peelable seal 230. For example, the seal 232 may be a more permanent seal, such as a fusion seal between the thermoplastic films that form the pouch 220. Sealed within the pouch 220 is a microwave heatable product 270, which we assume to be a food item.

The container 250 constrains the pouch 220 at the bottom all 253 and side walls 252 of the container (any gaps between the pouch 220 and the side walls 252 are assumed to be small), but not at the top wall 254 of the container. Between the top wall 254 and a top of the pouch 220, a headspace is formed which is identified as an expansion region 256.

Figure 2B:
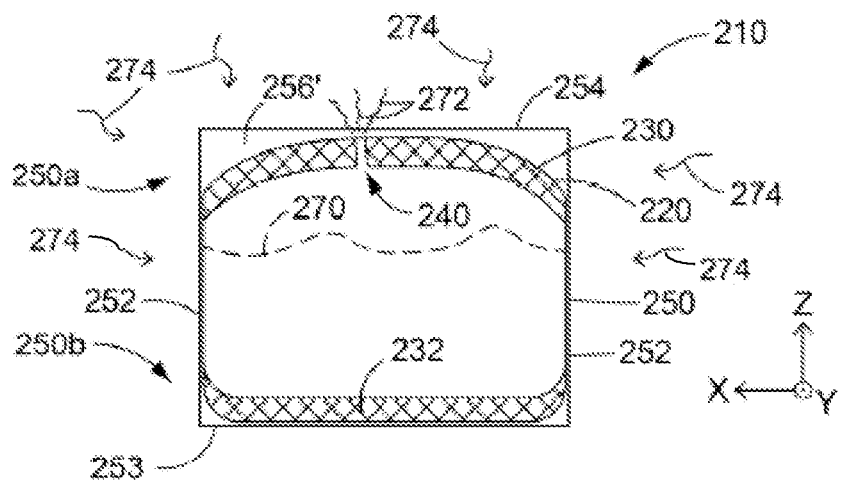
FIG. 2B is a schematic view of the same package in a heated state after or while being exposed to microwave radiation, the heated package self-venting through to separation formed in the peelable seal.

In FIG. 2B, the package 210 of FIG. 2A is shown again, but now in a heated state after or while being exposed to microwave radiation 274. In the figures in general, like elements are designated by like reference numerals as stated above, and needs no further discussion; furthermore, elements that have similar reference numerals may assumed to be similar or even the same, e.g., a seal 632 may be assumed to be similar to a seal 232, unless otherwise indicated explicitly or by the context of the discussion. By virtue of the now-heated product 270 and its associated heated fluids, a pressure within the pouch 220 has increased compared to the unheated state. The pouch 220 accordingly expands to till more space in the container 250, pressing against the side walls 252 and bottom wall 253 which constrain further expansion of the pouch. The bottom portion 250b of the container constrains the pouch 220 such that, in the heated state depicted, the pouch 220 has expanded toward, and into, the expansion region 256. Which is now labeled with a prime (i.e., expansion region 256') because of its decreased size relative to the unheated state of FIG. 2A. The increased pressure acting on the peelable seal 230, and the unconstrained condition of that seal, combine to create a separation 240 in the seal 230. Steam 272 or other hot gasses produced by the heated product 270 escape or vent to the surrounding atmosphere through the separation 249. The package 210 is thus self-venting.

Note that in order to accomplish the self-venting, the pouch 220 requires no separate venting device or mechanism, but instead relies on the selective constraint provided by the container on some parts of the pouch, and a reduced or lack of constraint on a part of the pouch that includes at least a portion of the peelable seal proximate an expansion region.

Turing now to FIGS. 3 through 5B, we see there schematic illustrations of various pouch designs that may be used in the disclosed packages, keeping in mind that the disclosed packages are by no means limited to such designs.

Figure 3:
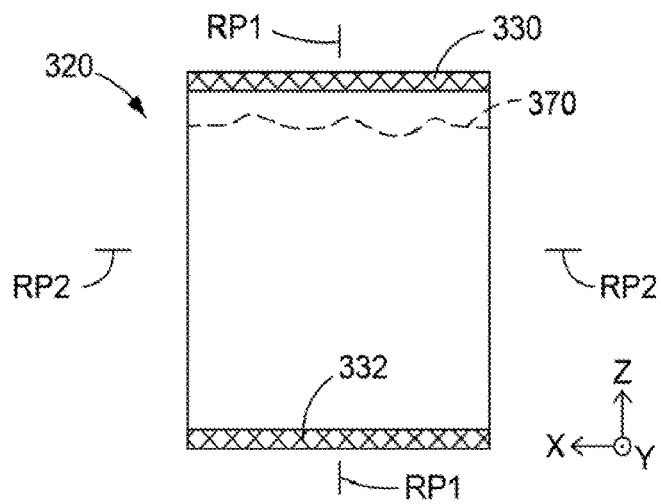
FIG. 3 is a schematic side or sectional view of a pouch that may be used in some the disclosed packages.

A generalized pouch 320 is shown in FIG. 3. This pouch 320 and its components and features may be the same as or similar to packages discussed above. The pouch 320 includes a first thermoplastic film, a second thermoplastic film, and a peelable seal 330 that seals a portion of the first thermoplastic film to a portion of the second thermoplastic film. The first and second thermoplastic films may form walls on opposite sides of the pouch. In some cases, the first and second thermoplastic films may be substantially the same, and in fact may be different portions of a single piece of thermoplastic film. In other cases the first and second thermoplastic films may be substantially different, e.g. the first thermoplastic film may have a different polymer composition, or a different number of constituent layers, or a substantially different thickness, than that of the second thermoplastic film.

Along, an edge of the pouch 320 opposite the peelable seal 330, the pouch also includes another seal 332. The seal 332 may be substantially the same as the peelable seal 330, e.g. the seal 332 may the same type of peelable seal as the peelable seal 330, with substantially the same peel strength. Alternatively, the seal 332 may be a different type of seal than peelable seal 330, with a different (e.g. greater) peel strength than that of peelable seal 330. Sealed within the pouch 329 is a microwave heatable product 370, which may be a food item. The pouch 320 and its variations discussed herein are composed of materials and otherwise configured to be compatible with heating a sealed product in a microwave oven.

Figure 4A:
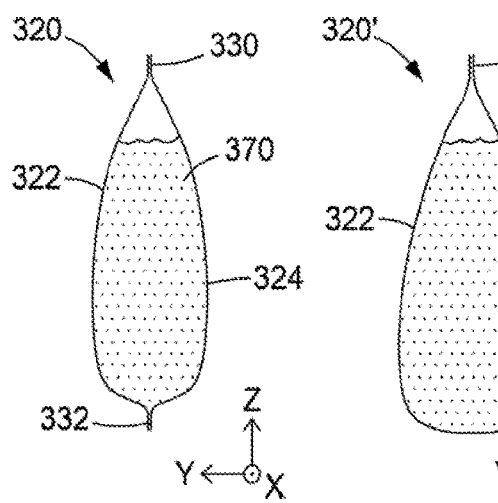
FIG. 4A is a schematic cross-sectional view of a pouch such as that of FIG. 3 through a vertical (y-z) plane.
Figure 4B:
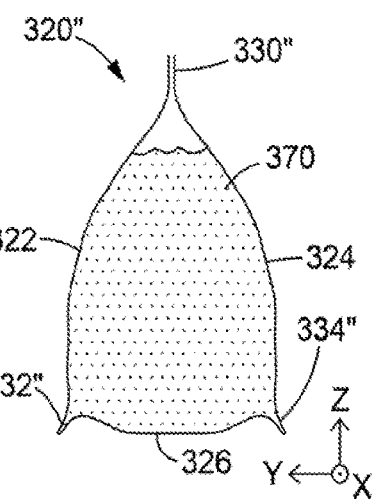
FIGS. 4B and 4c are similar view of alternative pouch.
Figure 4C:
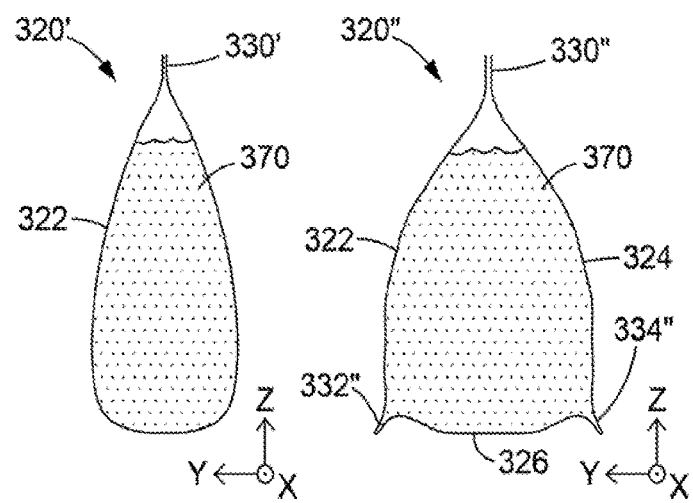
Figure 5A:
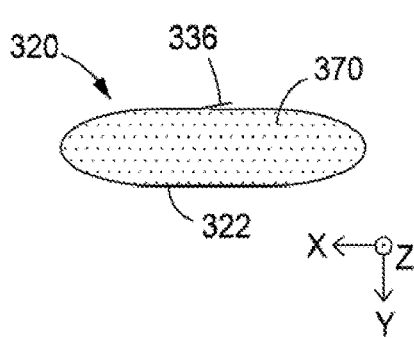
FIG. 5A is a schematic cross-sectional view of a pouch such as that of FIG. 3 through a horizontal (x-y) plane.
Figure 5B:
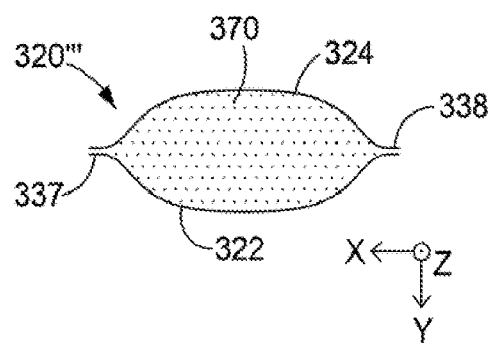
FIG. 5B is a similar view of an alternative pouch.

Further details of the pouch 320, or variations of the pouch 320, are provided in the cross-sectional schematic drawings of FIGS. 4A through 5B. FIGS. 4A through 4C are schematic views through a vertical (y-z) plane, as indicated generally by the reference plane RP1 in FIG. 3. FIGS. 5A and 5B are schematic views through a horizontal (x-y) plane, as indicated generally by the reference plane RP2 in FIG. 3.

In FIG. 4A, the pouch 320 is shown in the indicated vertical cross-sectional plane. The pouch 320 has a first thermoplastic film 322 and a second thermoplastic film 324, portions of which are sealed to each other to form the peelable seal 330 at the top of the pouch, and other portions of which are sealed to each other to form the seal 332 at the bottom of the pouch. The food product 370 is enclosed and isolated inside the pouch 320. As discussed previously, in general, the thermoplastic films 322, 324 may be the same, e.g. different portions of a single piece of thermoplastic film, or they may be substantially different.

In FIG. 4B, an alternative pouch 320' is shown that may be similar to pouch 320, except that the lower seal 332 has been eliminated and replaced by a bend or fold in the thermoplastic film 322. Otherwise, a peelable seal 330' is provided that may be the same as or similar to the peelable seal 330.

In FIG. 4C, another alternative pouch 320" is shown. Pouch 320" is a gusseted-style pouch to contrast with the pillow-style pouches of FIGS. 4A and 4B. The pouch 320" includes a first, second, and third thermoplastic film 322, 324, 326 respectively, the third thermoplastic film 326 forming a bottom panel of the gusset and the other thermoplastic films forming side panels of the gusset. Portions of the first and second thermoplastic films 322, 324 are sealed together to form a peelable seal 330" at the top of the pouch 320'. Portions of the first and third thermoplastic films 322, 326 are sealed together to the a seal 332', and portions of the second and third thermoplastic films 324, 326 are sealed together to form a seal 334". The seals 332" and 334" may each or both be substantially the same as the peelable seal 330, e.g. the seals 332", 334" may the same type of peelable seal as the peelable seal 330", with substantially the same peel strength. Alternatively, either or both of seals 332", 334" may be a different type of seal than peelable seal 330", with a different (e.g. greater) peel strength than that of peelable seal 330". In some embodiments, first, second and third thermoplastic films 322, 324, 326 may be the same thermoplastic film, with the gusset formed or plowed in a fold between and connecting the first thermoplastic film (or panel) 322 and the second thermoplastic film (or panel) 324.

In FIG. 5A, the pouch 320 is shown in the indicated horizontal cross-sectional plane. The pouch 320 has a thermoplastic film 322 that is folded over itself to define the pouch cavity in which the food product 370 is enclosed and isolated. Opposed edge portions of the thermoplastic film 322 seal to each other along a lap-seal 336. The seal 336 may be substantially the same as the peelable seal 330, e.g. the seal 336 may the same type of peelable seal as the peelable seal 330, with substantially the same peel strength. Alternatively, the seal 336 may be a different type of seal than peelable seal 330, with a different (e.g. greater) peel strength than that of peelable seal 330.

In FIG. 5B, an alternative pouch 320''' is shown. The pouch 320''' includes first and second thermoplastic films 322, 324, edge portions of which seal to each other at seals 337, 338. The seals 337 and 338 may each or both be substantially the same as the peelable seal 330, e.g. the seals 337, 338 may the same type of peelable seal as the peelable seal 330, with substantially the same peel strength. Alternatively, either or both of seals 337, 338 may be a different type of seal than peelable seal 330, with a different (e.g. greater) peel strength than that of peelable seal 330.

FIG. 6A shows a package 610 that includes a container 650 and a pouch 620. The package, container, and pouch may be the same as or similar to packages, containers, and pouches described above, except as otherwise noted. The container 650 has side walls 652 and, at a bottom portion 650b of the container, a bottom wall 653 (i.e. floor or base). At a top portion 650a, the container 650 is open-ended. A reference plane RP defines the upper extremity of the side walls 652, below which an object can be said to be disposed in (i.e., below which an object does not protrude from) the container 650 and above which an object cannot be said to be disposed in (i.e., above which an object protrudes from) the container 650. The pouch 620 is shown after having a food item 670 filled and sealed therein, but before being placed into the container 650. The pouch 620 has a peelable seal 630 along a top edge, and another seal 632 (which may be the same as the peelable seal 630 but in other cases may be different) along a bottom edge.

FIGS. 6B and 6C show the package 610 with the pouch 620 disposed inside the container 650, with FIG. 6B showing the package in an unheated state, e.g., at ambient room temperature, and FIG. 6C showing the package in a heated state, e.g., during or after being exposed to microwave radiation 674 in a microwave oven. The pouch 620 has a height or vertical dimension (along the z-axis) that is less than that of the container 650, such that, in the unheated state of FIG. 6B, an expansion region 656 in the form of a pressure relief opening 658 is formed above the pouch 620. Also in the unheated state, no portion of the pouch 620 protrudes from the container 650. Upon heating, the pouch 620 expands due to increased internal pressure from the heated contents. The heated pouch 620 presses against the side walls 652 and bottom wall 653 of the container, which constrain further expansion of the pouch 620 at those locations. The bottom portion 650b of the container thus constrains the heated pouch 620 such that the pouch 620 expands toward the expansion region 656 and the pressure relief opening 658. Depending upon design details of the pouch and container, in some cases the top of the heated pouch 620 may protrude beyond the reference plane RP, while in other cases the heated pouch 620 may not so protrude. In either case, the increased pressure acting on the peelable seal 630, and the unconstrained condition of that seal, combine to create a separation 640 in the peelable seal 630. Steam 672 or other hot gasses produced by the heated food item 670 escape or vent to the surrounding atmosphere through the separation 640. The package 610 is thus self-venting. After heating, a user may remove the heated package 610 from the microwave oven, and access or dispense the heated food item 670 by pulling apart some or all of the remaining intact portion of the peelable seal 630, or by any other desired technique.

Figure 7A:
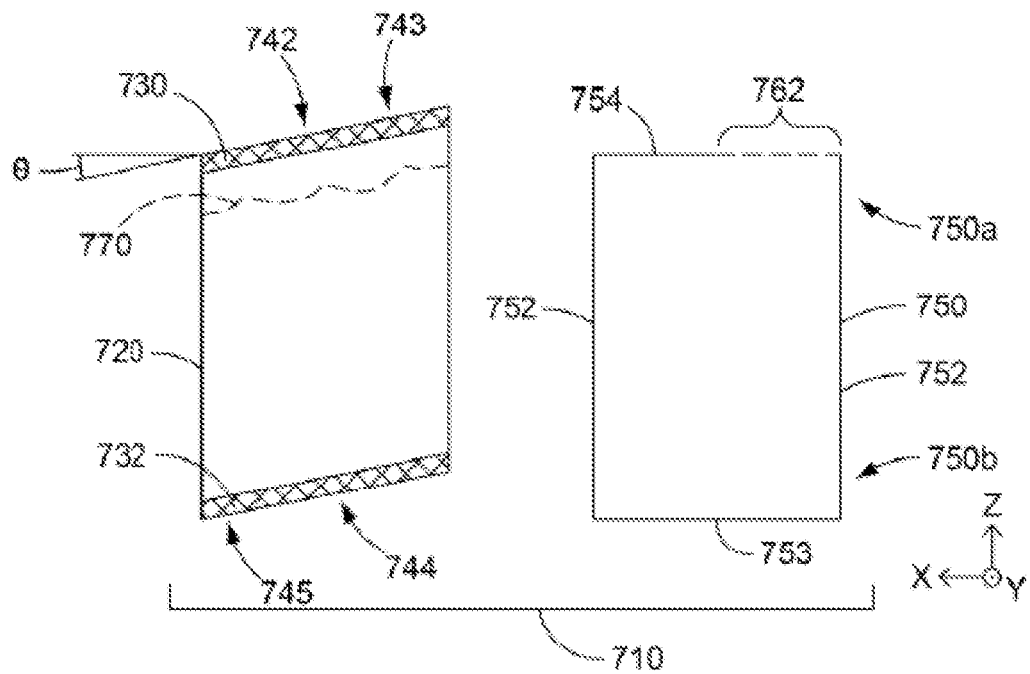
FIG. 7A is a schematic side or sectional view of another combination pouch/container for use as a package, the pouch having a non-rectangular parallelogram shape and the container having a frangible container portion.
Figures 7B, 7C:
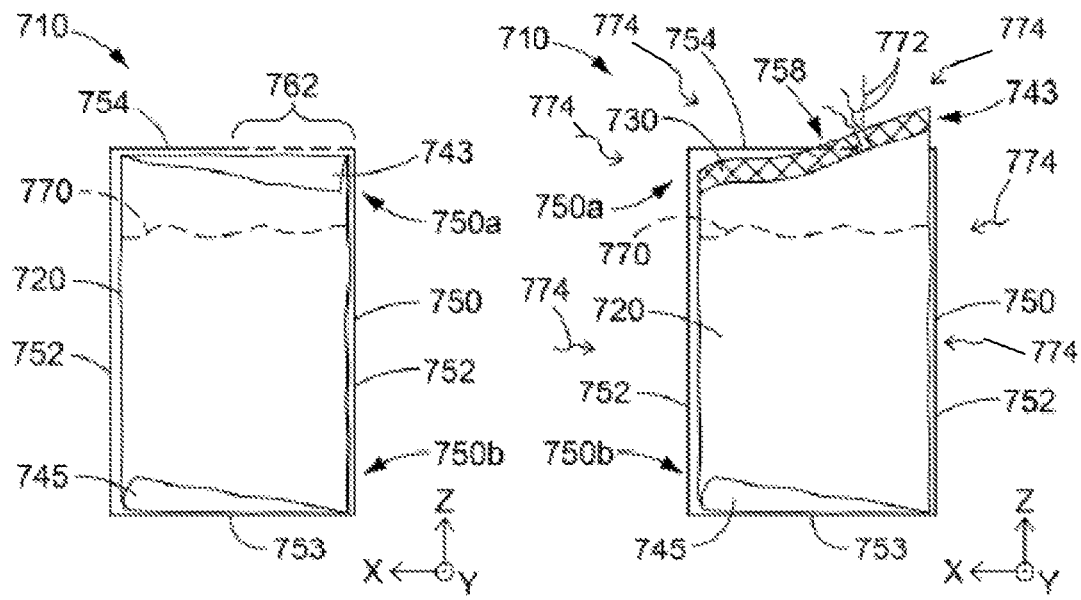
FIGS. 7B and 7C show the same combination but where the pouch is placed inside the container, the package being in an unheated state in FIG. 7B and being in a heated state (and self-venting through a separation in a peelable seal) in FIG. 7C.

FIGS. 7A-C are similar to FIGS. 6A-C, but for a package 710 in which the pouch 720 has a different, tailored shape, and the container 750 has a frangible portion 762. FIG. 7A shows a package 710 that includes a container 750 and a pouch 720. The package, container, and pouch may be the same as or similar to packages, containers, and pouches described above, except as otherwise noted. The container 750 has side walls 752 and, at a bottom portion 750b of the container, a bottom wall 753 (i.e., floor or base). At a top portion 750a, the container 750 has a top wall 754 (i.e. cover), which includes a solid or stationary portion, and a frangible portion 762.

The frangible portion 762 may be designed to separate completely, or only partially, or other portions of the top wall. If the design is for complete separation, then "removal" of the frangible portion 762 completely disconnects the frangible portion from all remaining portions of the top wall 754. If on the other hand the design is for only partial separation, then "removal" of the frangible portion 762 disconnects the frangible portion from some portions but not other portions of the top wall 754, e.g., by creating a tab in the top wall 754, separating the tab from the remainder of the wall along three sides of the tab, and folding or hinging the tab relative to the remainder of the wall along the (intact) fourth side of the tab. Both in the case of complete separation and in the case of partial separation, when the frangible portion is "removed", a pressure relief opening is created in the container.

In FIG. 7A, the pouch 720 is shown after having a food item 770 filled and sealed therein, but before being placed into the container 750. The pouch 720 has a peelable seal 730 along a top edge, and another seal 732 (which may be the same as, the peelable seal 730 but in other cases may be different) along a bottom edge. The pouch 720 has a top profile 742 defined by a profile of the peelable seal 730. The top profile 742 is non-flat, in fact it is straight but slanted at an angle θ relative to a horizontal plane. The slant in the top profile 742 defines an uppermost portion 743 (relative to other portions of the top profile 742) of the pouch. The pouch 720 similarly has a bottom profile 744, which is defined by a profile of the lower seal 732. The bottom profile 744 is also non-flat, in fact it is also straight but slanted at the same angle θ relative to a horizontal plane. The slant hi the bottom profile 744 defines a lowermost portion 745 (relative to other portions of the bottom profile 744 of the pouch. In this embodiment, the pouch 720 has a height or vertical dimension (along the z-axis) that is greater than that of the container 750.

FIGS. 7B and 7C show the package 710 with the pouch 720 disposed inside the container 750, with FIG. 7B showing the package hi an unheated state, e.g., at ambient room temperature, and FIG. 7C showing the package in a heated state, e.g., during or after being exposed to microwave radiation 774 in a microwave oven. As a result of the pouch 720 having a greater height than that of the container 750, portions of the pouch 720 are folded over to allow (in the unheated state) the pouch to fit substantially completely within the container 750, with substantially no portion of the pouch 720 protruding from the container 750. In the unheated state of FIG. 7B, the frangible portion 762 of the top wall 754 serves as an expansion region above the pouch 720 for the package 710. The pouch 720 is preferably positioned in the container 750 such that the uppermost portion 743 of the pouch 720 (temporarily folded over before heating) is proximate the frangible portion 762, as shown in FIG. 7B. This positioning ensures that when a pressure in the pouch rises during heating, expansion or movement of the pouch 720 occurs preferentially at the uppermost portion 743, so that portion of the pouch can press against the frangible portion 762 and/or protrude from a pressure relief opening 758 formed by the frangible portion's removal.

Figure 7D:
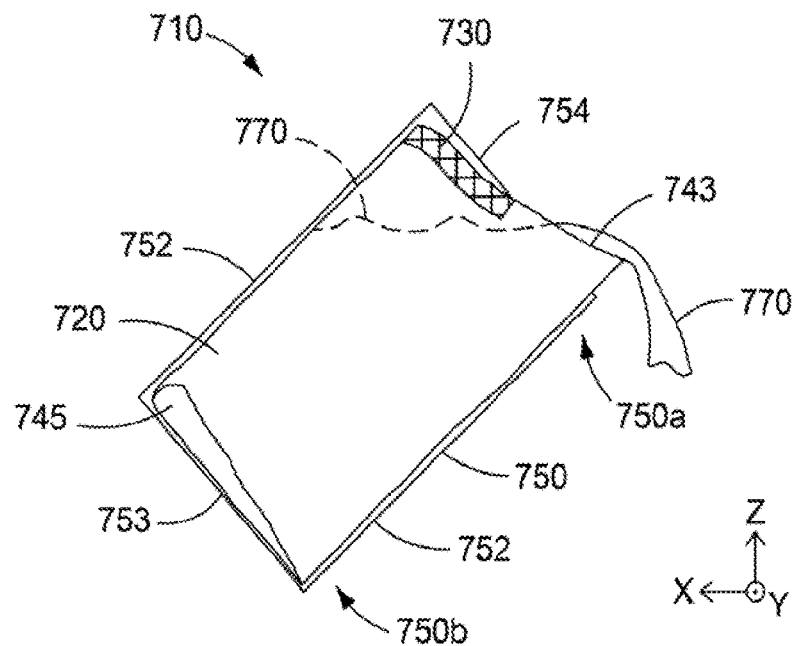
FIG. 7D is a schematic view of the package of FIG. 7C after further separating more of the peelable seal to form a spout from a portion of the pouch.

Upon heating, the pouch 720 expands due to increased internal pressure from the heated contents. The heated pouch 720 presses against the side walls 752 and bottom wall 753 of the container, which constrain further expansion of the pouch 720 at those locations. The bottom portion 750b of the container thus constrains the heated pouch 720 such that the pouch 720 expands toward the expansion region of the package 710, tithe frangible portion 762 is removed (whether partially or completely) by the user before heating, so as to create a pressure relief opening 758, then the expansion region is the opening 758 created by the (partially or completely) removed frangible portion 762. Otherwise— if the frangible portion 762 is still intact at the onset of heating—then the expansion region is initially the frangible portion 762, which constrains the expanding pouch 720 to a lesser degree than the solid or stationary walls of the container. Due to the geometry of the pouch 720, and with the uppermost portion 743 located next to the frangible portion, as the pouch 720 expands, the uppermost portion of the pouch exerts a force on the frangible portion 762, and the frangible portion is tailored so that force is sufficient to remove the frangible portion 762 and create in its place the pressure relief opening 758. In either case, the pressure relief opening 758 is ultimately created from the (complete or partial) removal of the frangible portion 762. Thereafter, continued expansion of the heated pouch causes the uppermost portion 743 of the pouch 720 to protrude through the pressure relief opening 758 as shown in FIG. 7C. Furthermore, the increased pressure acting on the peelable seal 730, and the unconstrained condition of that seal, combine to create a separation 740 in the peelable seal 730. (The separation 740 may occur in the portion of the peelable seal 730 at the uppermost portion 743 as shown, or it may occur at a portion of the peelable seal that has not protruded from the container 759). Steam 772 or other hot gasses produced by the heated food item 779 escape or vent to the surrounding atmosphere through the separation 740. The package 710 is thus self-venting. After heating, a user may remove the heated package 710 from the microwave oven, and access or dispense the heated food item 779 by pulling apart some or all of the remaining intact portion of the peelable seal 730, or by any other desired technique. As shown in FIG. 7D, the uppermost portion 743 of the pouch 720 may conveniently operate as a spout from which the heated food item 770 can be poured, by grasping the relatively cool container 750 and tilting or tipping the package 719.

Numerous design details of the disclosed packages, such as the shape of the pouch, and the relative size of the pouch compared to the container, may be adapted for optimal performance in a given application. With regard to embodiments characterized generally by FIGS. 7A-C, the slant angle $\theta$ of the pouch 720 can be tailored as desired, in some cases being less than 45 degrees, or less than 30 degrees, or in a range from 5 to 45 degrees, or in a range from 5 to 30 degrees, for example. The slant angle $\theta$ may also be tailored in combination with the length (the dimension parallel to the x-axis in FIG. 7A) of the frangible portion 762 of the container 750. In particular, for small slant angles, the length of the frangible portion may be increased to better accommodate the more gently sloped uppermost portion 743 of the pouch, while for greater slant angles, the length of the frangible portion 762 may be made smaller. In one embodiment, the pouch 720 may have a slant angle $\theta$ of 18.5 degrees, and the frangible portion 762 (or the pressure relief opening 758 formed when the frangible portion is removed) may have a length of 2 inches and a width (the dimension parallel to the y-axis in FIG. 7A) of 1.25 inches. Making the pouch height greater than the container height (but folding the pouch as needed so that it fits within the container, as described herein) may help limit spillage or splatter of the product during heating in the microwave oven. An example of the height difference in an embodiment similar to that of FIG. 7A is a container height of 4 inches and a pouch height of 7 inches, for a pouch whose slant angle $\theta$ is 18.5 degrees.

Figure 8:
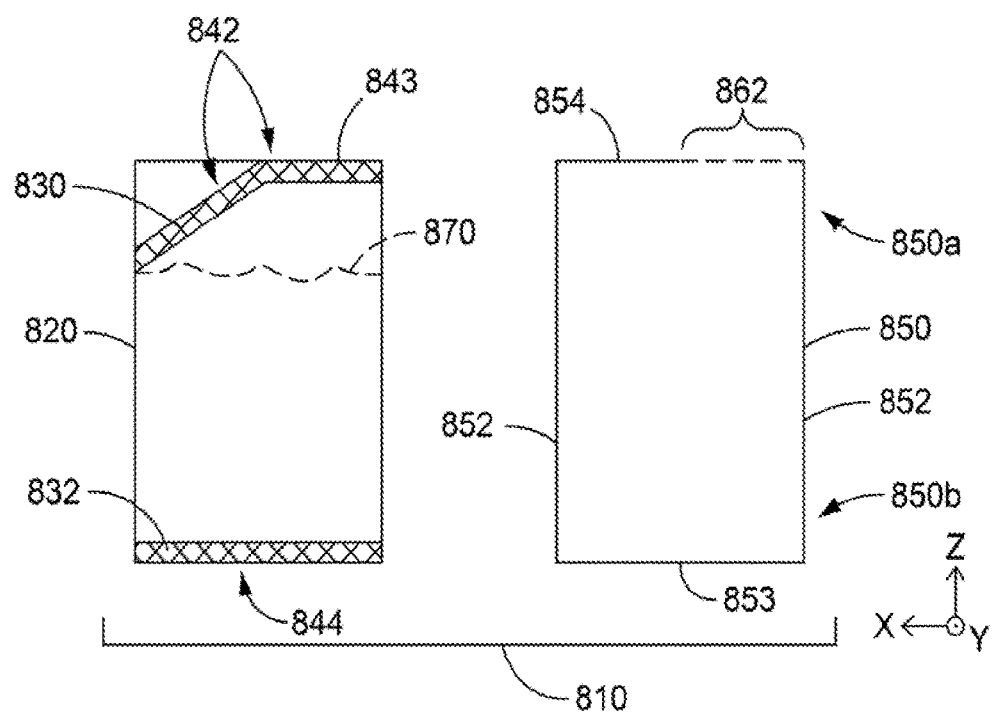
FIG. 8 is a schematic side or sectional view of another combination pouch/container for use as a package.

FIG. 8 shows a package 810 that is similar in many respects to the package of FIG. 7, but for a modified pouch shape. The package 819 includes a container 850 and a pouch 820. The package, container, and pouch may be the same as or similar to packages, containers, and pouches described above, particularly those of FIG. 7, except as otherwise noted. The container 850 has side walls 852 and, at a bottom portion 850b of the container, a bottom wall 853. At a top portion 850a, the container 850 has a top wall 854 or cover, which includes a solid or stationary portion, and a frangible portion 862. The frangible portion 862 may be designed to separate completely, or only partially, from other portions of the top wall, in like fashion to the frangible portion 762 of FIG. 7. In FIG. 8, the pouch 820 is shown after having a food item 870 filled and sealed therein, but before being placed into the container 850. The pouch 820 has a peelable seal 830 along or near a top edge, and another seal 832 (which may be the same as the peelable seal 830 but in some cases may be different) along a bottom edge. The poach 820 has a top profile 842 defined by a profile of the peelable seal 830. The top profile 842 is non-flat and also non-straight, defining an uppermost portion 843 of the pouch. The pouch 820 also has a bottom profile 844, which is defined by a profile of the lower seal 832. In this case, the bottom profile 844 is flat, such that no lowermost portion is defined. Similar to the pouch of FIG. 7, the pouch 820 has a height or vertical dimension that is greater than that of the container 850.

As a result of the pouch 820 having a greater height than that of the container 850, the uppermost portion 843 of the pouch 820 may be folded over to allow (in the unheated state) the pouch to fit substantially completely within the container 850, optionally with substantially no portion of the pouch 820 protruding from the container 850. In the unheated state, the frangible portion 862 serves as an expansion region above the pouch 820 for the package 810. The pouch 820 is preferably positioned in the container 850 such that the uppermost portion 843 of the pouch 820 (temporarily folded over before heating) is proximate the frangible portion 862, analogous to the arrangement of 7B, and for the same or similar reasons.

Upon heating, the pouch 820 expands due to increased internal pressure from the heated contents. The bottom portion 850b of the container constrains the heated pouch 820 such that the pouch 820 expands toward an expansion region of the package 810. The expansion region may be a pressure relief opening created by the removal of the frangible portion by a user, or the expansion region may initially be the frangible portion 862, which is later removed by pressure exerted by the uppermost portion 843 on the frangible portion 862 to create the pressure relief opening. In either case, the pressure relief opening is ultimately created from the removal of the frangible portion 862. Thereafter, continued expansion of the heated pouch causes the uppermost portion 843 of the pouch 820 to protrude through the pressure relief opening, analogous, to FIG. 7C. Also, the increased pressure acting on the peelable seal 830, and the unconstrained condition of that seal, combine to create a separation in the peelable seal 830. The separation may occur in the uppermost portion 843, protruding out of a pressure relief opening in the container 850, or it may occur at a portion of the peelable seal that does not protrude from the container 850. Steam or other hot gasses escape or vent through the separation. The package 840 is thus self-venting. After heating, a user may remove the heated package 810 from the microwave oven, and access or dispense the heated food item by pulling apart some or all of the remaining intact portion of the peelable seal 830, or by any other desired technique. The uppermost portion 843 of the pouch 820 may conveniently serve as a spout from which the heated food item can be poured, by tilting or tipping the package.

Figure 9:
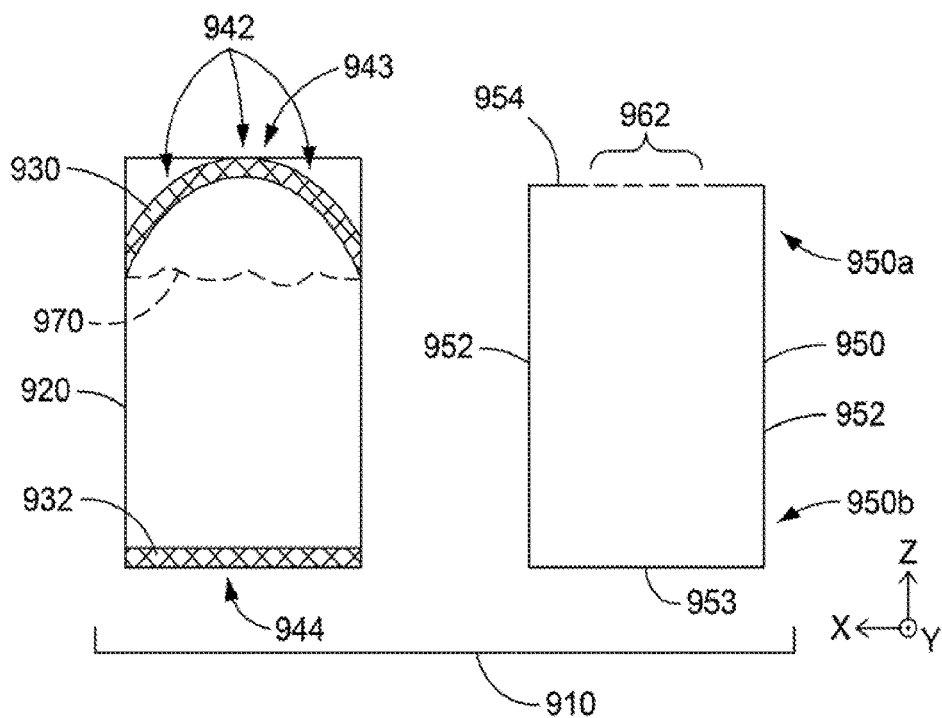
FIG. 9 is a schematic side, or sectional view of another combination pouch/container for use as a package.

FIG. 9 shows a package 910 that is similar in many respects to the packages of FIGS. 7 and 8, but for still another modified pouch shape, and for a modified placement of the frangible portion on the container. The package 910 includes a container 959 and a pouch 920. The package, container, and pouch may be the same as or similar to packages, containers, and pouches described above, particularly those of FIGS. 7 and 8, except as otherwise noted. The container 950 has side walls 952 and, at a bottom portion 950b of the container, a bottom wall 953. At a top portion 950a, the container 950 has a top wall 954 or cover, which includes a solid or stationary portion, and a centrally located frangible portion 962. The frangible portion 962 may be designed to separate completely, or only partially, from other portions of the top wall, in like fashion to the frangible portions of FIGS. 7 and 8. In FIG. 9, the pouch 920 is shown after having a food item 970 filled and sealed therein, but before being placed into the container 950. The pouch 920 has a peelable seal 930 along or near a top edge, and another seal 932 (which may be the same as the peelable seal 930 but in some cases may be different) along a bottom edge. The pouch 920 has a top profile 942 defined by a profile of the peelable seal 930. The top profile 942 is non-flat and also non-straight, defining an uppermost portion 943 at a central location on the top edge of the pouch. The pouch 920 also has a bottom profile 944, which is defined by a profile of the lower seal 932. In this case, the bottom profile 944 is flat, such, that no lowermost portion is defined. Similar to the pouch of FIGS. 7 and 8, the pouch 920 has a height or vertical dimension that is greater than that of the container 950.

As a result of the pouch 920 having a greater height than that of the container 950, the uppermost portion 943 of the pouch 920 may be folded over to allow (in the unheated state) the pouch to lit substantially completely within the container 950, optionally with substantially no portion of the pouch 920 protruding from the container 950. In the unheated state, the frangible portion 962 serves as an expansion region above the pouch 920 for the package 910. The pouch 920 is preferably positioned in the container 950 such that the (centrally located) uppermost portion 943 of the pouch 920 (temporarily folded over before heating) is proximate the (centrally located) frangible portion 962, analogous to the arrangement of 7B, and for the same or similar reasons.

Upon heating, the pouch 920 expands due to increased internal pressure from the heated contents. The bottom portion 950b of the container constrains the heated pouch 920 such that the pouch 920 expands toward an expansion region of the package 910. The expansion region may be a pressure relief opening created by the removal of the frangible portion by a user, or the expansion region may initially be the frangible portion 962, which is later removed by pressure exerted by the uppermost portion 943 on the frangible portion 962 to create the pressure relief opening. In either case, the pressure relief opening is ultimately created from the removal of the frangible portion 962. Thereafter, continued expansion of the heated pouch causes the uppermost portion 943 of the pouch 920 to protrude through the pressure relief opening, analogous to FIG. 7C. Also, the increased pressure acting on the peelable seal 930, and the unconstrained condition of that seal, combine to create a separation in the peelable seal 930. The separation may occur in the uppermost portion 943, protruding out of a pressure relief opening in the container 950, or it may occur at a portion of the peelable seal that does not protrude from the container 950. Steam or other hot gasses escape or vent through the separation. The package 910 is thus self-venting. After heating, a user may remove the heated package 910 from the microwave oven, and access or dispense the heated food item by pulling apart some or all of the remaining intact portion of the peelable seal 930, or by any other desired technique. The uppermost portion 943 of the pouch 920 may conveniently serve as a spout from which the heated food item can be poured, by tilting or tipping the package.

Figures 10, 11:
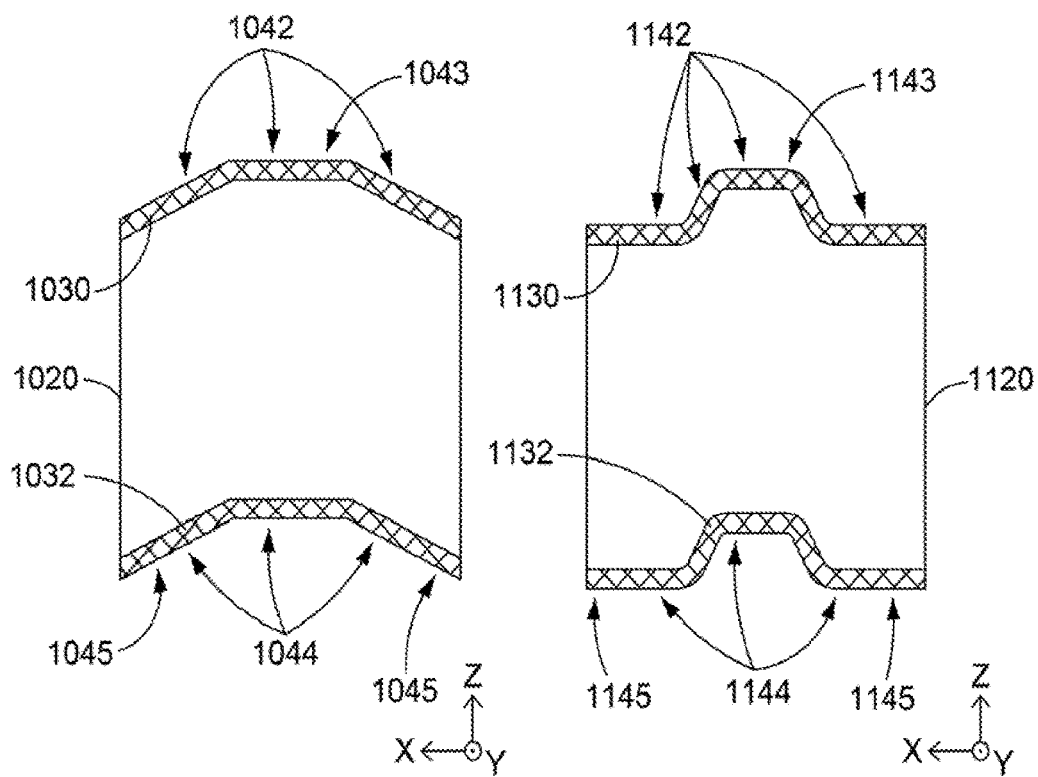
FIGS. 10 and 11 are schematic side or sectional views of sealed pouches that may be used in at least some of the disclosed packages.

FIGS. 10 and 11 are schematic views of some alternatively shaped pouches that can be combined with suitably designed containers (by following the teachings of FIGS. 7-9) to provide packages in which, upon heating, an uppermost portion of the pouch emerges and protrudes from a pressure relief opening in the container, the uppermost portion of the pouch also optionally forming a spout.

In FIG. 10, a pouch 1020 has a peelable seal 1030 along a top edge, and another seal 1032 (which may be the same as the peelable seal 1030 but in some cases may be different) along a bottom edge. The pouch 1020 has a top profile 1042 defined by a profile of the peelable seal 1030. The top profile 1042 is non-flat and also non-straight, ceding uppermost portion 1043 at a central location on the top edge of the pouch. The pouch 1020 also has a bottom profile 1044, which is defined h a profile of the lower seal 1032, the bottom profile defining two lowermost portions 104 of the pouch 1020. In this case, the bottom profile 1044 has the same or similar shape as the top profile 1042.

In FIG. 11, a pouch 1120 has a peelable seal 1130 along a top edge, and another seal 1132 (which may be the same as the peelable seal 1130 but in some cases may be different) along a bottomedge. The pouch 1120 has a top profile 1142 defined by a profile of the peelable seal 1130. The top profile 1142 is non-flat and also non-straight, defining an uppermost portion 1143 at a central location on the top edge of the pouch. The pouch 1120 also has a bottom profile 1144, which is defined by a profile of the lower seal 1132, the bottom profile defining two lowermost portions 1145 of the pouch 1120. Here again, the bottom profile 1144 has the same or similar shape as the top profile 1142.

Figures 12, 13:
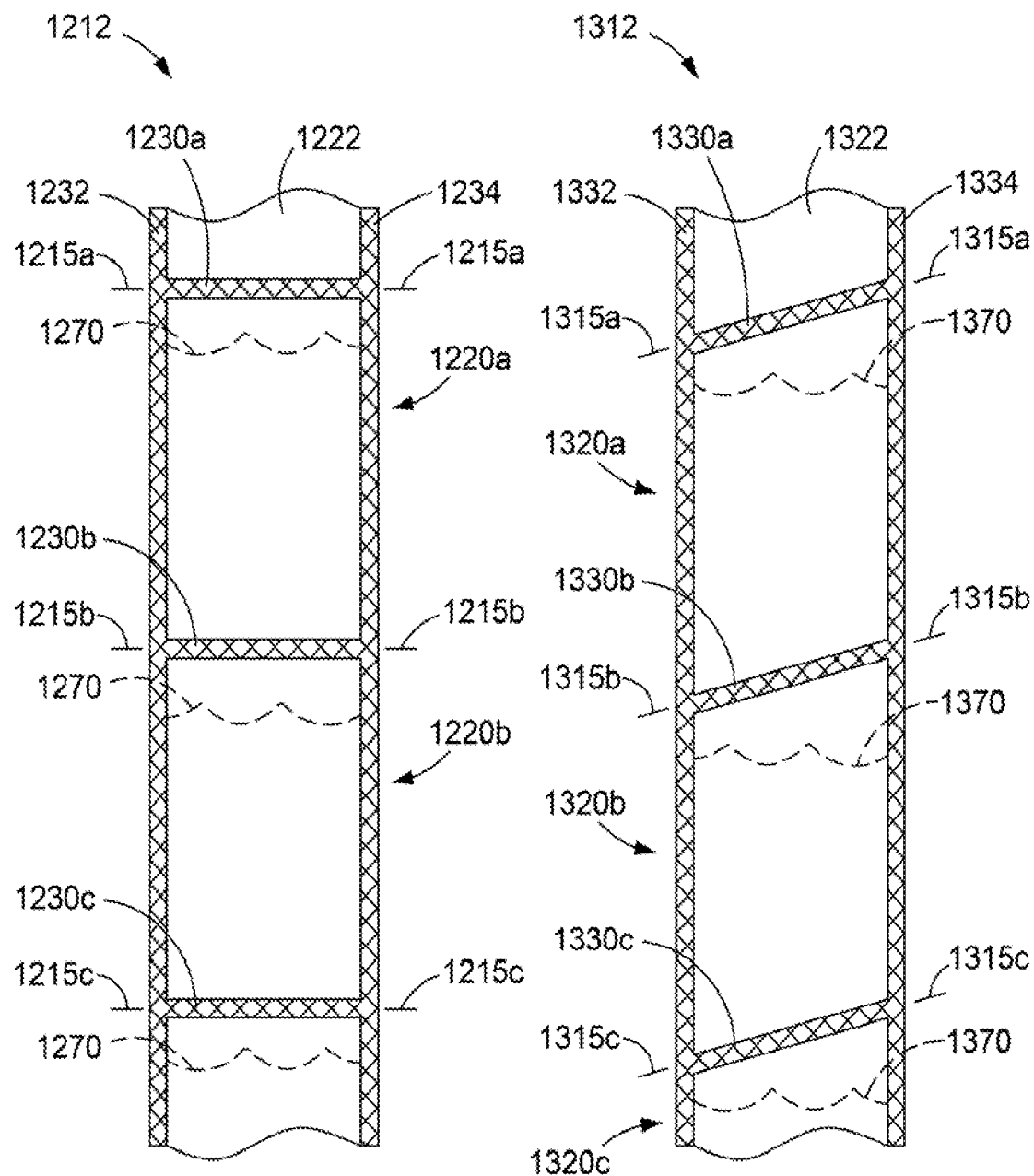
FIG. 12 is a schematic side or sectional view of a series of sealed pouches before being separated into individual pouches.
FIG. 13 is a schematic side or sectional view of a series of sealed pouches similar to FIG. 12, but where each pouch has a non-rectangular parallelogram shape.

FIGS. 12 and 13 illustrate intermediate pouch products that may be produced in a high volume food processing setting or the like. For these products, one or more thermoplastic films are formed into a continuous chain of sealed pouches, each pouch filled and sealed with a desired food item. The manufacture of these products may involve one or more of hot fill, retort, or other sterilization processes. In FIG. 12, an intermediate pouch product 1212 comprises one or more thermoplastic films 1222 that may be continuously or step-wise processed using known sterile or other sealing and filling equipment to provide a continuous chain of filled, sealed pouches 1220a, 1220b, etc. The thermoplastic film(s)1222 are sealed along continuous edge seals 1232, 1234, and along transverse seals 1230a, 1230b, 1230c, etc., to provide a chain of physically connected but fluidly isolated pouches 1220a, 1220b, etc. (collectively 1220), each such pouch filled with the desired food item 1270. The pouches 1220 can be separated into individual pouches suitable for use m the disclosed packages by cutting the intermediate pouch product 1212 along cut lines 1215a, 1215b, 1215c, etc., these cut lines lengthwise bisecting each of the transverse seals such that approximately half of a given transverse seal (e.g., transverse seal 1230b) becomes a seal on one pouch (e.g. pouch 1220b), and the other half becomes a seal on an adjacent pouch (e.g. pouch 1220a). The cut lines may alternatively be adjusted such to bisect or divide the original transverse seals unequally between adjacent pouches. Such an unequal division may, for example, be used so the resulting pouches have a top peelable seal that is narrower than a bottom peelable seal, or vice versa.

The same arrangement is presented in FIG. 13, except that the transverse seals and cut lines are tilted to define non-rectangular parallelogram-shaped pouches. Thus, in FIG. 13, an intermediate pouch product 1312 comprises one or more thermoplastic films 1322 that may be continuously or step-wise processed using known sterile or other sealing and filling equipment to provide a continuous chain of filled, sealed pouches 1320a, 1320b, 1320c, etc. The thermoplastic film (s) 1322 are sealed along continuous edge seals 1332, 1334, and along transverse seals 1330a, 1330b, 1330c, etc., to provide a chain of physically connected but fluidly isolated pouches 1320a, 1320b, etc. (collectively 1320), each such pouch filled with the desired food item 1370. The pouches 1320 can be separated into individual pouches suitable for use in the disclosed packages by cutting the intermediate pouch product 1312 along cut lines 1315a, 1315b, 1315e, etc., these cut lines lengthwise bisecting each of the transverse seals such that half of a given transverse seal (e.g. transverse seal 1330b) becomes a seal on one pouch (e.g. pouch 1320b), and the other half becomes a seal on art adjacent pouch (e.g., pouch 1320a). The cut lines may alternatively be adjusted such to bisect or divide the original transverse seals unequally between adjacent pouches. Such an unequal division may, for example, be used so the resulting pouches have a top peelable seal that is narrower than a bottom peelable seal, or vice versa.

Still referring to the products in FIGS. 10 and 11, in cases where the transverse seals are peelable seals having the appropriate peel strength, the bisecting procedure provides a peelable seal at at least two edges of each individual pouch. The bisecting procedure also produces matching opposing profiles for each individual pouch, e.g. as shown in FIGS. 3, 6A, 7A, 10, and 11. In some cases, a single folded or tubular thermoplastic film can be used, to eliminate one or both of the edge seals (e.g., 1232, 1234 and 1332, 1334) in the illustrated intermediate pouch products.

Figure 14:
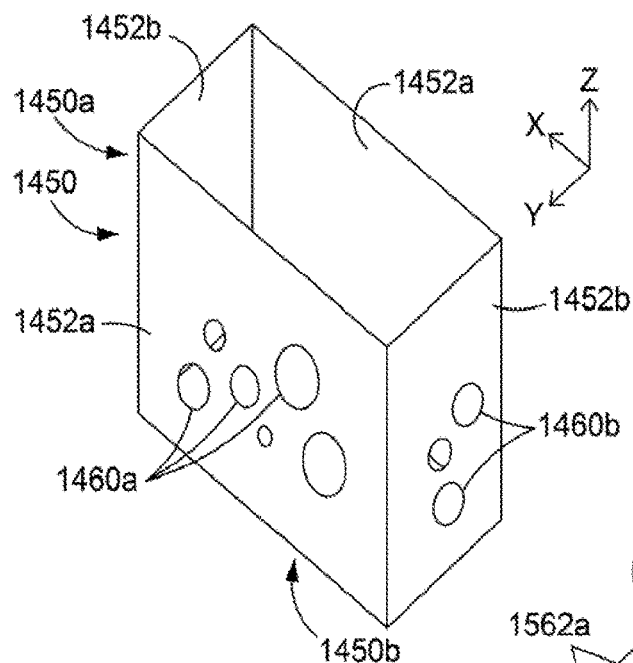
FIG. 14 is a schematic perspective view of a container for use in some of the disclosed packages, the container having a pressure relief opening at a top of the container.
Figure 15:
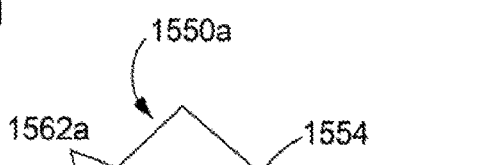
FIG. 15 is a schematic perspective view of another container for use in some of the disclosed packages, the container having a frangible container portion which can be removed to form a pressure relief opening, the container also having curved side surfaces.
Figure 16:
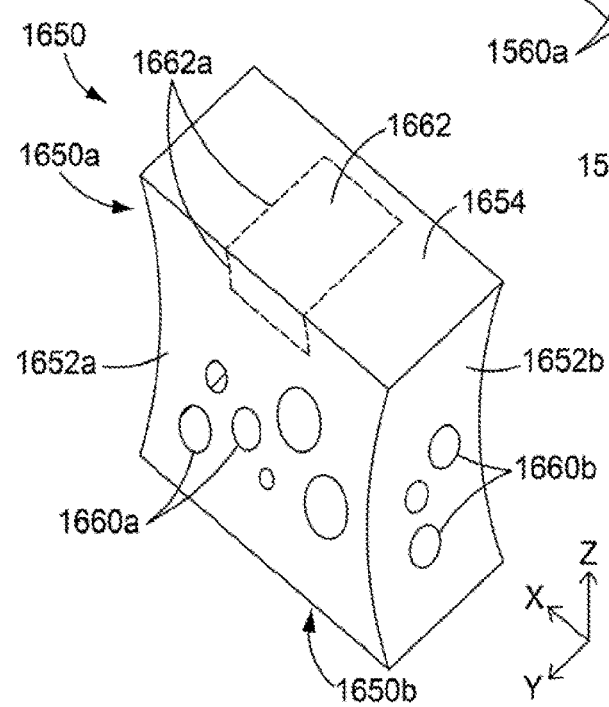
FIG. 16 is a schematic perspective view of a container that may be similar to that of FIG. 15, except that the frangible container portion is centrally located at the top portion of the container.

FIGS. 14, 15, and 16 illustrate example containers that, when combined with suitable pouches as described herein, can provide embodiments of the disclosed packages. These containers may incorporate any of the container-related features described above, except as otherwise noted.

In FIG. 14, a container 1450 includes major side walls 1452a, minor side walls 1452b, and, at a bottom portion 1450b of the container, a bottom wall (floor or base) which is not easily labeled in the figure. At a top portion 1450a, the container 1450 is open-ended. All of the side walls 1452a, 1542b are substantially flat or planar. Optional viewing holes 1460a are provided in one or both of the major side walls 1452a, and additional viewing holes 1460b are optionally provided in one or both of the minor side walls 1452b. The container 1450 may have the general shape of a rectangular parallelpiped.

In FIG. 15, a container 1550 includes major side walls 1552a, minor side walls 1552b, and, at a bottom portion 1550b of the container, a bottom wall (floor or base) which is not easily labeled in the figure. The major side walk 1552a are substantially flat or planar, and the minor side walls 1552b are curved. This combination provides the container 1550 with an hourglass-like shape in a front view of the package. At a top portion 1550a, the container 1550 is closed with a top wall (cover) 1554, which includes a frangible portion 1562 defined by a series of perforations 1562a or other elements that provide a line of weakness around at least a portion, and in some cases only a portion (less than all), of the perimeter of the frangible portion 1562. The frangible portion 1562 is thus capable of being readily removed (wholly or partially) from the remainder of the container 1550. As shown, the frangible portion 1562 may also include portions of one or more side walls of the container. The frangible portion 1562 is disposed asymmetrically at one side of the container 1550. Optional viewing holes 1560a are provided in one or both of the major side walls 1552a, and additional viewing holes 1560b are optionally provided in one or both of the minor side walls 1552b.

In FIG. 16, a container 1650 includes major side walls 1652a, minor side walls 1652b, and, at a bottom portion 1650b of the container, a bottom wall (floor or base) which is not easily labeled in the figure. The major side walls 1652a are substantially flat or planar, and the minor side walls 1652b are curved. This combination provides the container 1650 with an hourglass-like shape in a front view of the package. At a top portion 1650a, the container 1650 is closed with a top wall (cover) 1654, which includes a frangible portion 1662 defined by a series of perforations 1662a or other elements that provide a line of weakness around at least a portion, and in some cases only a portion (less than all), of the perimeter of the frangible portion 1662. The frangible portion 1662 is thus capable of being readily removed (wholly or partially) from the remainder of the container 1650. As shown the frangible portion 1662 may also include portions of one or more side walls of the container. The frangible portion 1662 is disposed centrally between the two minor side walls of the container 1650. Optional viewing holes 1660a are provided in one or both of the major side walls 1652a, and additional viewing holes 1660b are optionally provided in one or both of the minor side walls 1652b.

EXAMPLES

Example 1

Table 1 sets forth a high barrier, peelable packaging film useful in the construction of flexible pouches as described herein. The film web is typically formed as a lamination of the heat resistant outer web (layer A) to a coextruded blown film having seven layers (layer C-H). The lamination is completed using a high performance 2-component adhesive system (layer B) and forms a web which has a total thickness of about 3.5 mil. Table 1 provides the details of the identity of the various materials present in each of the film layers, the arrangement of each of the film layers, and the relative proportions of each of the materials in each of the film layers. In the table, OPET refers to oriented polyethylene terephthalate, ULDPE refers to ultra low density polyethylene, LLDPE refers to linear low density polyethylene, PE refers to polyethylene. EVOH refers to a a saponified or hydrolyzed copolymer of ethylene and vinyl acetate, e.g. having 38 mol % ethylene, EVA refers to a copolymer of ethylene with vinyl acetate, and PB-1 refers to polybutene.

TABLE 1

| ---Layer Identifier--- | ---Composition--- |
| --- | --- |
| A, outer web | OPET, 48 ga, corona treated |
| B | Adhesive, 2-part urethane chemistry |
| C | 64% ULDPE, 35% LLDPE, 1% additives |
| D | 86% LLDPE, 14% anhydride modified PE |
| E | 100% EVOH, 38 mol % |
| F | 86% LLDPE, 14% anhydride modified PE |
| G | 82% EVA copolymer, 18% PB-1 |
| H | 95% EVA copolymer, 5% additives |

A vertical form fill seal (VFFS) style pouch with a fin seal in the machine direction was made using the thermoplastic film of Table 1, and assembled and filled manually, for testing purposes. The overall width of the pouch was approximately 4 inches and the length as approximately 7 inches. Seal widths were about 5/16 inch and were made on lab sealing equipment (275° F., 40 psi, 1.5 seconds). The end seals were peelable seals, and were offset from horizontal by 20 degrees, creating a pouch having a non-rectangular parallelogram shape as shown in FIG. 7A, with θ equal to about 20 degrees. The pouch was filled with approximately 8 fluid ounces of tomato, soup. The pouch was filled with product including as little headspace gas as possible (i.e., virtually none).

The container was constructed from 16 point SUS (solid unbleached sulfate) paperboard. The container was folded and adhered with the white coated side directed to the inside. The assembled box had a rectangular parallelpiped shape with dimensions of 4⅝×2⁹⁄₁₆"×1¾", the longest dimension being vertically oriented during use.

The filled and sealed pouch was loaded into the container, with one of the end seals oriented to the bottom of the box, orienting the general shape of the poach with the general shape of the container. The top portion of the pouch was pushed down below the top edge of the container, and the flaps that formed the top of the container were closed and adhered. No attachment was made between the pouch and container.

For testing purposes, the entire top wall of the container was removed from the package. The resulting package was placed in a microwave oven and cooked on high for 90 seconds. When the cooking time was expired, the package was removed by hand. No burning of the hand occurred due to the insulative property provided by the container. Upon removal of the package from the microwave, it was found that the top edge of the pouch had exited or emerged (i.e., protruded) from the top of the container, and the top seal (a peelable seal) had peeled open in a small channel near the middle of the top seal, which was unconstrained by the container. The top seal of the pouch was then peeled open completely by pulling the remaining top seal apart, allowing product access for pouring or eating directly from the pouch. If needed, the pouch can be removed from the container to allow the user to squeeze the last remaining portion of the product from the package. The pouch can then be disposed of and the container recycled.

Example 2

A pouch made of the same packaging film as the pouch of Example 1 was assembled and filled by hand. The configuration was a stand-up pouch style with a bottom gusset, including K seals at the bottom corners. Dimensions of the pouch were 5" (height), 6" (width), and 1½" gusset. The top seal, which was a peelable seal, had a width of ⁵⁄₁₆", and the side seals had widths of about ½". The pouch included a laser score in the exterior layer (OPET) of the film, oriented parallel to and spanning the same distance as the top seal, located approximately 1½" lower than the top of the pouch. A tear notch was provided in the outer edge of one of the side seals at the intersection of the score.

The container was made off different paperboard material with its coated side facing outward. A bottom panel of the container was hexagonal, with an edge-to-edge dimension of 3⅛" and having six identically sized side walls connected at each edge. Each of the six sidewalk was 1¾" wide and 3" in height. There was no top panel on the container, i.e., the container was open-ended at the top.

The pouch was filled with approximately 8 ounces of vegetable soup, leaving a small amount of headspace when sealing. The pouch was loaded in the container with the pouch gusset contacting the bottom panel of the container. No attachment was made between the pouch and container. As in Example 1, the upper portion of the pouch was pushed down into the container such that it was below the upper extremity of the side wall of the containers. The package was then put into the microwave oven and cooked on high for 90 seconds.

Upon removal, the container was found to be acceptable to touch with the hand (not too hot), and the pouch had vented along the center portion of the peelable top seal. The venting had occurred through a channel that had formed in the peelable top seal, approximately ¼" in width, the top portion of the pouch was then torn off at the tear notch and score line so that the soup could be consumed. Due to the shape of the stand-up pouch and the container, the user was able to access the entire contents of the pouch using a spoon. After use, the pouch was removed from the container for disposal, and the container was recycled.

Unless otherwise indicated, all numbers expressing feature sizes, amounts, ranges, limits, and physical and other properties used in the specification and claims are to be understood as being modified in all instances by the term "about". Accordingly, unless indicated to the contrary, the numerical parameters set forth in the specification and claims are approximations that can vary depending on the desired properties sought to be obtained by those skilled in the art utilizing the teachings disclosed herein.

As used in this specification and the appended claims, the singular Runs "a," "an," and "the" encompass embodiments having plural referents, unless the context clearly dictates otherwise. As used in this specification and the appended claims, the term "or" is generally employed in its sense including "and/or" unless the context clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

When a given element (including one or more elements, components, layers, or the like) is described as being "on," "connected to," "coupled to," or "attached to" another element (including one or more elements, components, layers, or the like), the given element can be directly on, directly connected to, directly coupled to, or directly attached to such other element, or an intervening element (including one or more elements, components, layers, or the like) may be interposed between the given element and the other element. When the given element is referred to as being "directly on," "directly connected to," "directly coupled to," "directly attached to," or "in contact with" the other element, there are no, or substantially no, intervening elements.

Various modifications of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. All U.S. patents, patent application publications, and other patent and non-patent documents referred to herein are incorporated by reference in their entireties to the extent they do not contradict the foregoing disclosure.

The invention claimed is:

1. A package, comprising:
   a flexible pouch within which is sealed a product; and
   a container sized to hold the pouch;
   wherein the pouch includes a first thermoplastic film, a second thermoplastic film, and a peelable seal that seals a portion of the first thermoplastic film to a portion of the second thermoplastic film; and
   wherein the package is configured for heating the sealed product in a microwave oven, and
   wherein the container defines an expansion region into which the pouch can expand, and the container holds the pouch such that at least a first portion of the peelable seal is disposed proximate the expansion region.

2. The package of claim 1, wherein the first and second thermoplastic films form walls on opposite sides of the pouch.

3. The package of claim 1, wherein the first and second thermoplastic films are different portions of a single piece of thermoplastic film.

4. The package of claim 1, wherein the package is configured such that when the package is exposed to microwaves, the product becomes heated, and a pressure inside the pouch increases to expand the pouch.

5. The package of claim 1, wherein the container has a bottom portion and a top portion, and the expansion region is located proximate the top portion, and wherein the bottom portion of the container constrains the pouch such that, in a heated state, the pouch expands toward the expansion region.

6. The package of claim 1, wherein the expansion region comprises a pressure relief opening.

7. The package of claim 6, wherein an expansion of the pouch causes a first portion of the pouch to protrude from the pressure relief opening, the first portion of the pouch including the first portion of the peelable seal.

8. The package of claim 7, wherein the protruding first portion of the pouch forms a spout.

9. The package of claim 1, wherein the expansion region includes a removable container portion that, when removed from the container, provides a pressure relief opening.

10. The package of claim 9, wherein the removable container portion is a frangible portion of the container.

11. The package of claim 9, wherein expansion of the pouch causes a first portion of the pouch to press against the removable container portion, the first portion of the pouch including the first portion of the peelable seal.

12. The package of claim 11, wherein the removable container portion is configured such that a force from the expanded pouch is sufficient to open the removable container portion.

13. The package of claim 1, wherein in an unheated state, substantially no portion of the pouch protrudes from the container.

14. The package of claim 1, wherein the package is configured such that, in a heated state, a pressure inside the pouch increases to expand the pouch to an extent that a separation is formed in a first portion of the peelable seal, such that the pouch self-vents through the separation.

15. The package of claim 14, wherein the peelable seal further comprises a second portion disposed proximate a wall of the container, such that in response to the increased pressure inside the pouch, the container constrains the pouch at the wall to avoid a separation occurring in the second portion of the peelable seal.

16. The package of claim 14, wherein the separation forms in the first portion of the peelable seal as a result of a proximity of the first portion of the peelable seal to an expansion region of the container.

17. The package of claim 1, wherein, at ambient temperature, the peelable seal has a peel strength in a range from 400 to 2,500 g/in.

18. The package of claim 1, wherein the pouch is gusseted.

19. The package of claim 1, wherein the container comprises one or more of paperboard, corrugated material, thermoplastic material, and thermoset material.

* * * * *

UNITED STATES PATENT AND TRADEMARK OFFICE
CERTIFICATE OF CORRECTION

PATENT NO. : 10,569,950 B2  
APPLICATION NO. : 16/066601  
DATED : February 25, 2020  
INVENTOR(S) : Peter M. Chen et al.

Page 1 of 2

It is certified that error appears in the above-identified patent and that said Letters Patent is hereby corrected as shown below:

On the Title Page

Item (57) (Abstract), Line 3: delete "box'" and insert -- box --  
Item (57) (Abstract), Line 8: delete "beating" and insert -- heating --  
Item (57) (Abstract), Line 9: delete "m"" and insert -- in --  
Item (57) (Abstract), Line 14: delete "sea!" and insert -- seal --

In the Specification

Column 1, Line 14: delete "know" and insert -- known --  
Column 1, Line 39: delete "b" and insert -- by --  
Column 1, Line 51: delete "turns" and insert -- films --  
Column 2, Line 30: after "package" insert -- that --  
Column 2, Line 36: delete "to" and insert -- a --  
Column 2, Line 38: after "some" insert -- of --  
Column 2, Line 41: delete "view of alternative pouch" and insert -- views of alternative pouches --  
Column 3, Line 30: after "self-vents" insert -- by --  
Column 4, Line 11: delete "remit" and insert -- retort --  
Column 4, Line 22: delete "kid" and insert -- food --  
Column 4, Line 38: delete "thin" and insert -- form --  
Column 4, Line 43: delete "7.000" and insert -- 7,000 --  
Column 5, Line 66: delete "or" and insert -- of --  
Column 6, Line 8: delete "or" and insert -- of --  
Column 8, Line 12: delete "cart" and insert -- can --  
Column 8, Line 27: delete "219" and insert -- 210 --  
Column 8, Line 33: delete "all" and insert -- wall --  
Column 8, Line 34: delete "253" and insert -- 254 --  
Column 8, Line 47: delete "all" and insert -- wall --  
Column 8, Line 64: delete "till" and insert -- fill --  
Column 9, Line 3: delete "256. Which" and insert -- 256, which --

Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 10,569,950 B2

Column 9, Line 10: delete "249" and insert -- 240 --
Column 9, Line 19: delete "Turing" and insert -- Turning --
Column 9, Line 47: delete "329" and insert -- 320 --
Column 10, Line 18: delete "320'" and insert -- 320" --
Column 10, Line 19: delete "the a seal 332'" and insert -- for a seal 332" --
Column 11, Line 53: delete "or other" and insert -- from other --
Column 12, Line 15: delete "hi" and insert -- in --
Column 12, Line 17: delete "744" and insert -- 744) --
Column 12, Line 23: delete "hi" and insert -- in --
Column 12, Line 52: delete "710, tithe" and insert -- 710. If the --
Column 13, Line 12: delete "759" and insert -- 750 --
Column 13, Line 13: delete "779" and insert -- 770 --
Column 13, Line 17: delete "779" and insert -- 770 --
Column 13, Line 23: delete "719" and insert -- 710 --
Column 13, Line 54: delete "819" and insert -- 810 --
Column 14, Line 4: delete "poach" and insert -- pouch --
Column 14, Line 48: delete "840" and insert -- 810 --
Column 14, Line 60: delete "959" and insert -- 950 --
Column 15, Line 23: delete "lit" and insert -- hit --
Column 16, Line 9: delete "ceding" and insert -- defining an --
Column 16, Line 12: delete "h" and insert -- by --
Column 16, Line 13: delete "104" and insert -- 1045 --
Column 16, Line 46: delete "m" and insert -- in --
Column 17, Line 11: delete "art" and insert -- an --
Column 17, Line 20: delete "at at" and insert -- at --
Column 17, Line 46: delete "side walk" and insert -- side walls --
Column 18, Line 42: delete "a a" and insert -- a --
Column 18, Line 62: delete "as" and insert -- was --
Column 19, Line 2: delete "tomato, soup" and insert -- tomato soup --
Column 19, Line 14: delete "poach" and insert -- pouch --
Column 19, Line 54: delete "off" and insert -- of a --
Column 19, Line 58: delete "sidewalk" and insert -- sidewalls --
Column 20, Line 26: delete "Runs" and insert -- forms --